US012126545B2

(12) United States Patent
Kimura et al.

(10) Patent No.: US 12,126,545 B2
(45) Date of Patent: Oct. 22, 2024

(54) COMMUNICATION DEVICE AND COMMUNICATION METHOD

(71) Applicant: SONY GROUP CORPORATION, Tokyo (JP)

(72) Inventors: Ryota Kimura, Tokyo (JP); Hiroaki Takano, Tokyo (JP); Hirofumi Kasai, Tokyo (JP); Fumio Teraoka, Kanagawa (JP); Kazuki Hayashi, Kanagawa (JP); Hiroki Watanabe, Kanagawa (JP); Tomonori Sato, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 62 days.

(21) Appl. No.: 17/760,380

(22) PCT Filed: Feb. 3, 2021

(86) PCT No.: PCT/JP2021/003861

§ 371 (c)(1),
(2) Date: Aug. 9, 2022

(87) PCT Pub. No.: WO2021/166644

PCT Pub. Date: Aug. 26, 2021

(65) Prior Publication Data

US 2023/0067181 A1 Mar. 2, 2023

(30) Foreign Application Priority Data

Feb. 18, 2020 (JP) ................................ 2020-025501

(51) Int. Cl.

| | |
|---|---|
| ***H04L 47/83*** | (2022.01) |
| ***H04L 47/80*** | (2022.01) |
| ***H04W 72/53*** | (2023.01) |

(52) U.S. Cl.
CPC ........... *H04L 47/803* (2013.01); *H04L 47/83* (2022.05); *H04W 72/53* (2023.01)

(58) Field of Classification Search
CPC ....... H04L 47/803; H04L 47/83; H04W 72/53
See application file for complete search history.

(56) References Cited

U.S. PATENT DOCUMENTS

| | | | | |
|---|---|---|---|---|
| 2008/0120240 | A1* | 5/2008 | Ginter | H04L 63/16 705/51 |
| 2018/0192390 | A1* | 7/2018 | Li | H04W 28/02 |
| 2022/0239726 | A1* | 7/2022 | Kimura | H04L 67/02 |

FOREIGN PATENT DOCUMENTS

| | | | |
|---|---|---|---|
| JP | 2016046736 | * | 8/2014 |
| JP | 2016-046736 | A | 4/2016 |
| JP | 2019-536305 | A | 12/2019 |

OTHER PUBLICATIONS

Sato et al. "Application Function Chaining Infrastructure for a 5G Core Network", Research Report of Information Processing Society of Japan, vol. 2019-DPS-180, No. 18 (Year: 2019).*

(Continued)

*Primary Examiner* — Glenton B Burgess
*Assistant Examiner* — Patrick F Ngankam
(74) *Attorney, Agent, or Firm* — CHIP LAW GROUP

(57) ABSTRACT

Provided is a communication device that operates as a management node in a first zone being a management domain on a network, the communication device including a communication unit that executes communication with another node and a control unit that controls communication executed by the communication unit. The control unit operates such that, when having received, from a user, a request regarding an application that chains one or more application functions (AFs) to act on a packet flowing in the network, the control unit acquires information regarding the application from a second zone being a management domain other (Continued)

than the first zone, and then calculates a deployment destination of the AFs in the network including the first zone and the second zone based on the information.

15 Claims, 57 Drawing Sheets

(56) References Cited

OTHER PUBLICATIONS

Sato, et al., "Application processing connection platform for 5G core networks", Information Processing Society of Japan SIG Technical Report, vol. 2019-EIP-85, No. 18, Sep. 20, 2019, pp. 1-8.

"Network Functions Virtualisation (NFV); Management and Orchestration", ETSI GS NFV-MAN 001, V1.1.1, Group Specification, Dec. 2014, 184 pages.

Halpern, et al., "Service Function Chaining (SFC) Architecture", Internet Engineering Task Force (IETF), Computer Science, Request for Comments 7665, Oct. 2015, 32 pages.

Sato, et al., "Application Function Chaining Infrastructure for a 5G Core Network", Research Report of Information Processing Society of Japan, vol. 2019-DPS-180, No. 18, Sep. 2019.

"System architecture for the 5G System (5GS)", 3rd Generation Partnership Project, Technical Specification Group Services and System Aspects, Stage 2, Release 16, 3GPP TS 23.501 V16.3.0, Dec. 2019, 417 pages.

International Search Report and Written Opinion of PCT Application No. PCT/JP2021/003861, issued on Apr. 20, 2021, 08 pages of ISRWO.

* cited by examiner

| Packet Type = Subscribe Request |
| --- |
| Spot ID = SID-spot1 |

FIG.7

| Packet Type = Subscribe Response |
| --- |
| Status = OK |

FIG.8

| Packet Type = Publish Request |
| --- |
| Node ID = NID-node1 |
| Resource Data = Resource-comp-node1 |

FIG.9

| Packet Type = Publish Response |
| --- |
| Status = OK |

FIG.10

| Packet Type = Subscribe Notification |
| --- |
| Spot ID = SID-spot1 |
| Resource Data = Resource-comp-spot1 |

FIG.11

| Number of Node Entries = 2 |
| --- |
| Node ID = NID-node1 |
| Resource Data = Resource-comp-node1 |
| Node ID = NID-node2 |
| Resource Data = Resource-comp-node2 |

FIG.12

| Number of Spot Entries = 1 |
| --- |
| Spot ID = SID-spot1 |
| Resource Data = Resource-comp-spot1 |

FIG.14

| Packet Type = Publish Request |
|---|
| Resource Data = Resource-nw-spot1 |

FIG.15

| Packet Type = Subscribe Notification |
|---|
| Spot ID = SID-spot1 |
| Resource Data = Resource-nw-spot1 |

FIG.16

Resource Data = Resource-nw-spot1

FIG.17

Resource Data = Resource-nw-spot2

FIG.18

| Number of Spot Entries = 2 |
|---|
| Spot ID = SID-spot1 |
| Resource Data = Resource-nw-spot1 |
| Spot ID = SID-spot2 |
| Resource Data = Resource-nw-spot2 |

FIG.20

| Packet Type = Register AF Request |
|---|
| User ID = UID-usr1 |
| Credential = Cred-usr1 |

FIG.21

| Packet Type = User AA Request |
|---|
| User ID = UID-usr1 |
| Credential = Cred-usr1 |
| Action Type = Write |
| Action Target = AF Catalog |

FIG.22

| Packet Type = User AA Response |
| --- |
| Status = OK |
| Service Ticket = STicket-usr1-write-afcat1 |

FIG.23

| Packet Type = Register AF Response |
| --- |
| Status = OK |

FIG.24

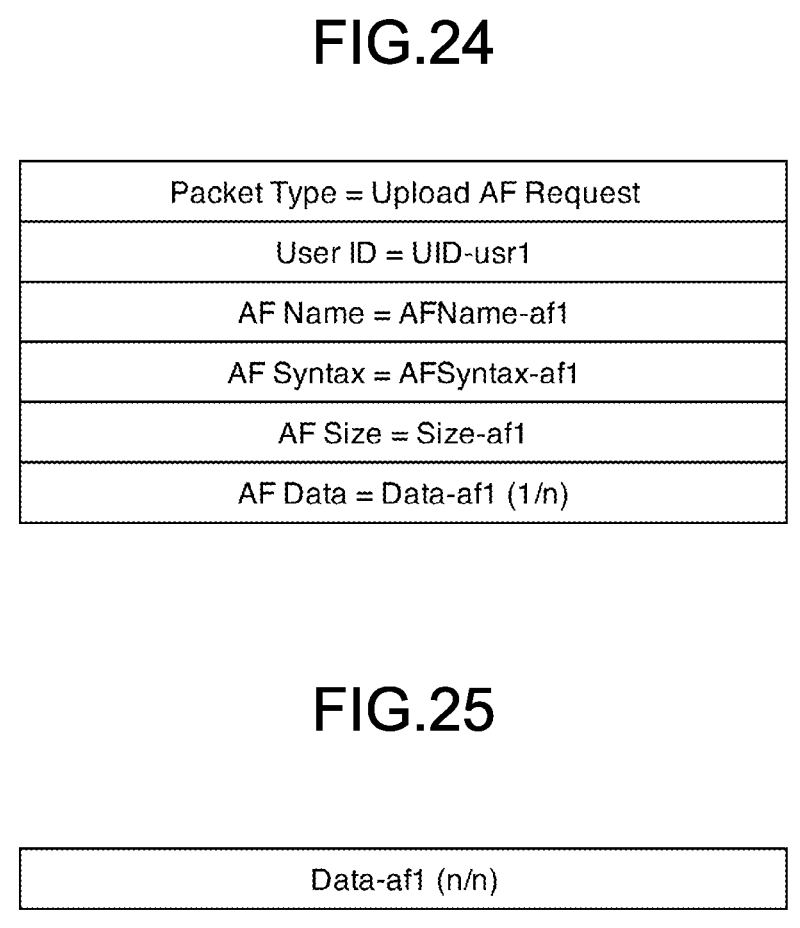

| Packet Type = Upload AF Request |
| --- |
| User ID = UID-usr1 |
| AF Name = AFName-af1 |
| AF Syntax = AFSyntax-af1 |
| AF Size = Size-af1 |
| AF Data = Data-af1 (1/n) |

FIG.25

| Data-af1 (n/n) |
| --- |

FIG.26

| Packet Type = Store AF Request |
| --- |
| User ID = UID-usr1 |
| AF Name = AFName-af1 |
| AF Syntax = AFSyntax-af1 |
| Service Ticket = STicket-usr1-write-afcat1 |
| AF Size = Size-af1 |
| AF Data = Data-af1 (1/n) |

FIG.27

| Packet Type = Store AF Response |
| --- |
| Status = OK |
| AF ID = AFID-af1 |

FIG.28

| Packet Type = Upload AF Response |
| --- |
| Status = OK |
| AF ID = AFID-af1 |

FIG.29

| Number of AF Entries = 1 |
| --- |
| AF Name = AFName-af1 |
| AF Syntax = AFSyntax-af1 |
| AF Size = Size-af1 |
| AF Data = Data-af1 |

FIG.30

| Number of Users = 1 |
|---|
| User ID = UID-usr1 |
| Number of Service Tickets = 1 |
| Service Ticket = STicket-usr1-write-afcat1 |
| Number of Estimate Entries = 0 |

FIG.32

| Packet Type = Show AF Request |
|---|
| User ID = UID-usr2 |
| Credential = Cred-usr2 |
| Number of Zones = 2 |
| Zone ID = ZID-zone1 |
| Search Conditions = SConditions-zone1-af |
| Zone ID = ZID-zone2 |
| Search Conditions = SConditions-zone2-af |

FIG.33

| Packet Type = User AA Request |
|---|
| User ID = UID-usr2 |
| Credential = Cred-usr2 |
| Action Type = Read |
| Action Target = AF Catalog |
| Number of External Zone IDs = 1 |
| Zone ID = ZID-zone2 |

FIG.34

| Packet Type = External User AA Request |
| --- |
| User ID = UID-usr2 |
| Credential = Cred-usr2 |
| Action Type = Read |
| Action Target = AF Catalog |

FIG.35

| Packet Type = External User AA Response |
| --- |
| Status = OK |
| Service Ticket = STicket-usr2-read-afcat2 |

FIG.36

| Packet Type = User AA Response |
|---|
| Status = OK |
| Number of Service Tickets = 2 |
| Zone ID = ZID-zone1 |
| Service Ticket = STicket-usr2-read-afcat1 |
| Zone ID = ZID-zone2 |
| Service Ticket = STicket-usr2-read-afcat2 |

FIG.37

| Packet Type = Search External AF Request |
|---|
| User ID = UID-usr2 |
| Service Ticket = STicket-usr2-read-afcat2 |
| Search Conditions = SConditions-zone2-af |

FIG.38

| Packet Type = Search AF Request |
|---|
| User ID = UID-usr2 |
| Service Ticket = STicket-usr2-read-afcat2 |
| Search Conditions = SConditions-zone2-af |

FIG.39

| Packet Type = Search AF Response |
|---|
| Status = OK |
| Number of AF Entries = Num-zone2-af |
| AF Entry = AFEntry-zone2-af1 |
| . . . |
| AF Entry = AFEntry-zone2-afN |

FIG.40

| Packet Type = Search External AF Response |
| --- |
| Status = OK |
| Number of AF Entries = Num-zone2-af |
| AF Entry = AFEntry-zone2-af1 |
| . . . |
| AF Entry = AFEntry-zone2-afN |

FIG.41

| Packet Type = Search AF Request |
| --- |
| User ID = UID-usr2 |
| Service Ticket = STicket-usr2-read-afcat1 |
| Search Conditions = SConditions-zone1-af |

FIG.42

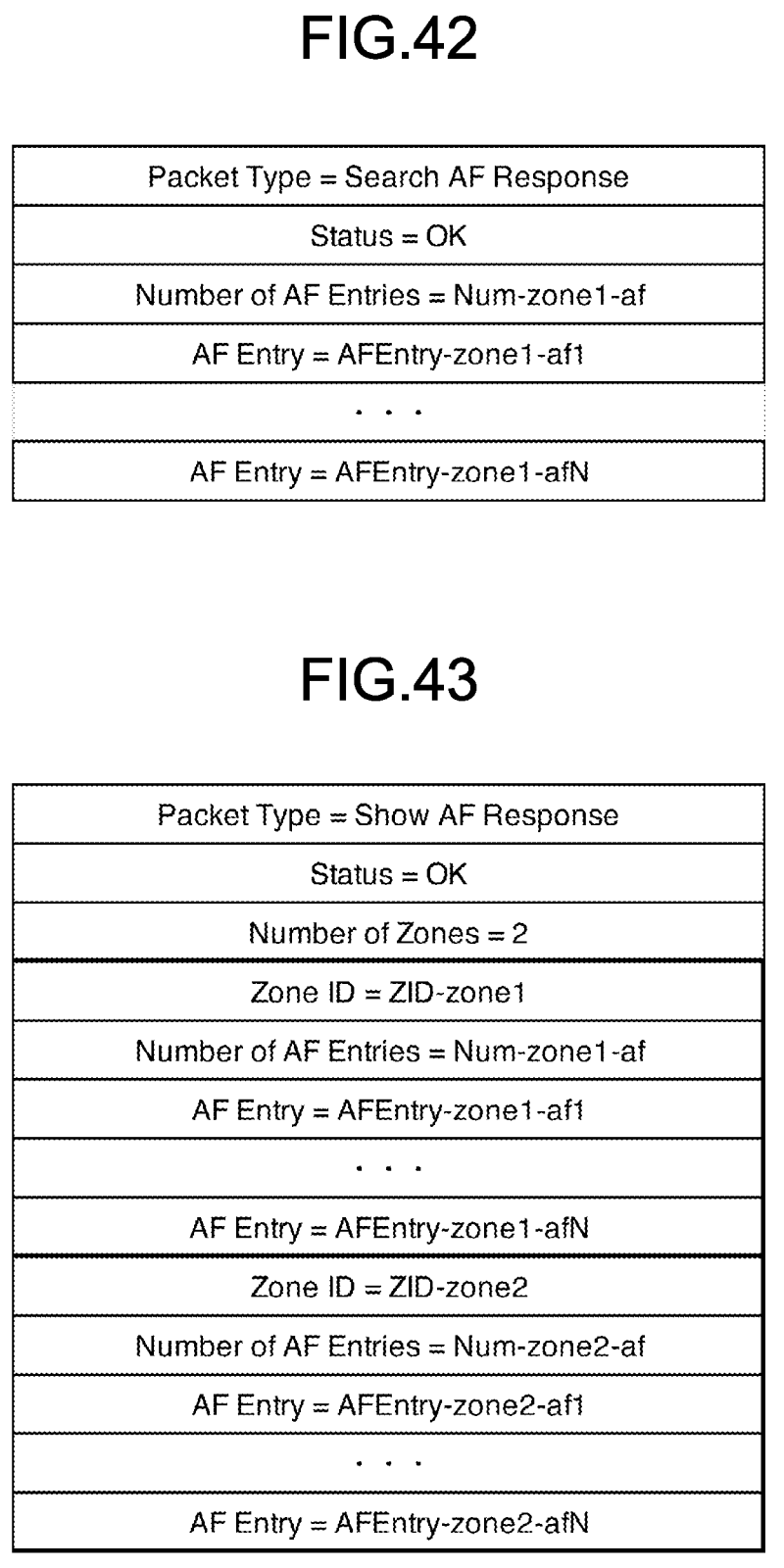

| Packet Type = Search AF Response |
|---|
| Status = OK |
| Number of AF Entries = Num-zone1-af |
| AF Entry = AFEntry-zone1-af1 |
| . . . |
| AF Entry = AFEntry-zone1-afN |

FIG.43

| Packet Type = Show AF Response |
|---|
| Status = OK |
| Number of Zones = 2 |
| Zone ID = ZID-zone1 |
| Number of AF Entries = Num-zone1-af |
| AF Entry = AFEntry-zone1-af1 |
| . . . |
| AF Entry = AFEntry-zone1-afN |
| Zone ID = ZID-zone2 |
| Number of AF Entries = Num-zone2-af |
| AF Entry = AFEntry-zone2-af1 |
| . . . |
| AF Entry = AFEntry-zone2-afN |

FIG.44

| Packet Type = Register Chained-AF Request |
| --- |
| User ID = UID-usr2 |
| Credential = Cred-usr2 |
| Chained-AF Name = ChainName-chain1 |
| Chained-AF Syntax = ChainSyntax-chain1 |
| Chained-AF Size = Size-chain1 |
| Chained-AF Data = Data-chan1 (1/n) |

FIG.45

| Data-chain1 (n/n) |
| --- |

FIG.46

| Packet Type = User AA Request |
|---|
| User ID = UID-usr2 |
| Credential = Cred-usr2 |
| Action Type = Write |
| Action Target = Chain Catalog |

FIG.47

| Packet Type = User AA Response |
|---|
| Status = OK |
| Service Ticket = STicket-usr2-write-chaincat1 |

FIG.48

| Packet Type = Store Chained-AF Request |
|---|
| User ID = UID-usr2 |
| Chained-AF Name = ChainName-chain1 |
| Chained-AF Syntax = ChainSyntax-chain1 |
| Chained-AF Size = Size-chain1 |
| Chained-AF Data = Data-chan1 (1/n) |

FIG.49

| Packet Type = Store Chained-AF Response |
|---|
| Status = OK |
| Chained-AF ID = CID-chain1 |

FIG.50

| Packet Type = Register Chained-AF Response |
|---|
| Status = OK |
| Chained-AF ID = CID-chain1 |

FIG.51

| Number of Chained-AF Entries = 1 |
|---|
| Chained-AF Name = ChainName-chain1 |
| Chained-AF Syntax = ChainSyntax-chain1 |
| Chained-AF Size = Size-chain1 |
| Chained-AF Data = Data-chain1 |

FIG.52

| Number of Users = 2 |
|---|
| User ID = UID-usr1 |
| Number of Service Tickets = 1 |
| Service Ticket = STicket-usr1-write-afcat1 |
| User ID = UID-usr2 |
| Number of Service Tickets = 3 |
| Service Ticket = STicket-usr2-read-afcat1 |
| Service Ticket = STicket-usr2-read-afcat2 |
| Service Ticket = STicket-usr2-write-chaincat1 |
| Number of Estimate Entries = 0 |

FIG.54

| Packet Type = Show Chained-AF Request |
| --- |
| User ID = UID-usr3 |
| Credential = Cred-usr3 |
| Search Conditions = SConditions-zone1-chain |

FIG.55

| Packet Type = User AA Request |
| --- |
| User ID = UID-usr3 |
| Credential = Cred-usr3 |
| Action Type = Read |
| Action Target = Chain Catalog |

FIG.56

| Packet Type = User AA Response |
|---|
| Status = OK |
| Service Ticket = STicket-usr3-read-chaincat1 |

FIG.57

| Packet Type = Search Chained-AF Request |
|---|
| User ID = UID-usr3 |
| Service Ticket = STicket-usr3-read-chaincat1 |
| Search Conditions = SConditions-zone1-chain |

FIG.58

| Packet Type = Search Chained-AF Response |
|---|
| Status = OK |
| Number of Chained-AF Entries = Num-zone1-chain |
| Chained-AF Entry = ChainEntry-zone1-chain1 |
| . . . |
| Chained-AF Entry = ChainEntry-zone1-chainN |

FIG.59

| Packet Type = Show Chained-AF Response |
|---|
| Status = OK |
| Number of Chained-AF Entries = Num-zone1-chain |
| Chained-AF Entry = ChainEntry-zone1-chain1 |
| . . . |
| Chained-AF Entry = ChainEntry-zone1-chainN |

FIG.60

| Packet Type = Estimate Application Request |
|---|
| User ID = UID-usr3 |
| Credential = Cred-usr3 |
| Chained-AF ID = CID-chain2 |
| User Specific Info = Info-usr3 |

FIG.61

| Packet Type = User AA Request |
|---|
| User ID = UID-usr3 |
| Credential = Cred-usr3 |
| Action Type = Estimate |
| Action Target = Orchestrator |
| Number of External Zone IDs = 1 |
| Zone ID = ZID-zone2 |

FIG.62

| Packet Type = External User AA Request |
|---|
| User ID = UID-usr3 |
| Credential = Cred-usr3 |
| Action Type = Estimate |
| Action Target = Orchestrator |

FIG.63

| Packet Type = External User AA Response |
|---|
| Status = OK |
| Service Ticket = STicket-usr3-est-orch2 |

FIG.64

| Packet Type = User AA Response |
| --- |
| Status = OK |
| Number of Service Tickets = 2 |
| Service Ticket = STicket-usr3-est-orch1 |
| Service Ticket = STicket-usr3-est-orch2 |

FIG.65

| Packet Type = Get Chained-AF Info Request |
| --- |
| User ID = UID-usr3 |
| Chained-AF ID = CID-chain2 |
| Service Ticket = STicket-usr3-read-chaincat1 |

FIG.66

| Packet Type = Get Chained-AF Info Response |
|---|
| Status = OK |
| Chained-AF Info = Info-chain2 |

FIG.67

| Packet Type = Estimate Chained-AF Request |
|---|
| User ID = UID-usr3 |
| Chained-AF ID = CID-chain2 |
| User Specific Info = Info-usr3 |
| Number of Service Tickets = 2 |
| Service Ticket = STicket-usr3-est-orch1 |
| Service Ticket = STicket-usr3-est-orch2 |
| Chained-AF Info = Info-chain2 |

FIG.68

| Packet Type = Estimate External AF Request |
|---|
| User ID = UID-usr3 |
| Chained-AF ID = CID-chain2 |
| User Specific Info = Info-usr3 |
| Service Ticket = STicket-usr3-est-orch2 |
| External-AFs Info = Info-ext-afs |

FIG.69

| Packet Type = Get Spot Resource Info Request |
|---|

FIG.70

| Packet Type = Get Spot Resource Info Response |
|---|
| Status = OK |
| Resource Info = Info-zone2-res |

FIG.71

| Packet Type = Estimate External AF Response |
|---|
| Status = OK |
| User ID = UID-usr3 |
| Chained-AF ID = CID-chain2 |
| Chained-AF Estimate = Estimate-chain2-zone2 |

FIG.72

| Packet Type = Get Spot Resource Info Response |
| --- |
| Status = OK |
| Resource Info = Info-zone1-res |

FIG.73

| Packet Type = Estimate Chained-AF Response |
| --- |
| Status = OK |
| User ID = UID-usr3 |
| Chained-AF ID = CID-chain2 |
| Chained-AF Estimate = Estimate-chain2 |

FIG.74

| Packet Type = Estimate Application Response |
|---|
| Status = OK |
| Chained-AF Estimate = Estimate-chain2 |

FIG.75

| Number of Chained-AFs = 0 |
|---|

FIG.76

| Number of Users = 3 |
|---|
| User ID = UID-usr1 |
| Number of Service Tickets = 1 |
| Service Ticket = STicket-usr1-write-afcat1 |
| User ID = UID-usr2 |
| Number of Service Tickets = 3 |
| Service Ticket = STicket-usr2-read-afcat1 |
| Service Ticket = STicket-usr2-read-afcat2 |
| Service Ticket = STicket-usr2-write-chaincat1 |
| User ID = UID-usr3 |
| Number of Service Tickets = 3 |
| Service Ticket = STicket-usr3-read-chaincat1 |
| Service Ticket = STicket-usr3-est-orch1 |
| Service Ticket = STicket-usr3-est-orch2 |
| Number of Estimate Entries = 1 |
| Chained-AF Info = Info-chain2 |
| Chained-AF Estimate = Estimate-chain2 |

FIG.78

| Packet Type = Deploy Application Request |
|---|
| User ID = UID-usr3 |
| Credential = Cred-usr3 |
| Chained-AF ID = CID-chain2 |

FIG.79

| Packet Type = User AA Request |
|---|
| User ID = UID-usr3 |
| Credential = Cred-usr3 |
| Action Type = Deploy |
| Action Target = Orchestrator |
| Number of External Zone IDs = 1 |
| Zone ID = ZID-zone2 |

FIG.80

| Packet Type = External User AA Request |
|---|
| User ID = UID-usr3 |
| Credential = Cred-usr3 |
| Action Type = Deploy |
| Action Target = Orchestrator |

FIG.81

| Packet Type = External User AA Response |
|---|
| Status = OK |
| Service Ticket = STicket-usr3-deploy-orch2 |

FIG.82

| Packet Type = User AA Response |
| --- |
| Status = OK |
| Number of Service Tickets = 2 |
| Zone ID = ZID-zone1 |
| Service Ticket = STicket-usr3-deploy-orch1 |
| Zone ID = ZID-zone2 |
| Service Ticket = STicket-usr3-deploy-orch2 |

FIG.83

| Packet Type = Deploy Chained-AF Request |
| --- |
| User ID = UID-usr3 |
| Chained-AF ID = CID-chain2 |
| Number of Service Tickets = 2 |
| Service Ticket = STicket-usr3-deploy-orch1 |
| Service Ticket = STicket-usr3-deploy-orch2 |
| Chained-AF Info = Info-chain2 |

FIG.84

| Packet Type = Deploy External AF Request |
| --- |
| User ID = UID-usr3 |
| Chained-AF ID = CID-chain2 |
| Service Ticket = STicket-usr3-deploy-orch2 |
| Chained-AF Info = Info-chain2 |

FIG.85

| Packet Type = Get Node Resource Info Request |
| --- |
| Number of Spots = Num-chain2-zone2-spot |
| Spot ID List = List-chain2-zone2-sid |

FIG.86

| Packet Type = Get Node Resource Info Response |
| --- |
| Status = OK |
| Number of Spot Entries = Num-chain2-zone2-spot |
| Spot ID = SID-zone2-spot1 |
| Resource Info = Info-zone2-spot1-res |
| . . . |
| Spot ID = SID-zone2-spotN |
| Resource Info = Info-zone2-spotN-res |

FIG.87

| Packet Type = Deploy AF Request |
| --- |
| User ID = UID-usr3 |
| Chained-AF ID = CID-chain2 |
| Chained-AF Info = Info-chain2-zone2 |

FIG.88

| Packet Type = Deploy AF Response |
|---|
| Status = OK |
| User ID = UID-usr3 |
| Chained-AF ID = CID-chain2 |
| Chained-AF Result = Result-chain2-zone2 |

FIG.89

| Packet Type = Deploy External AF Response |
|---|
| Status = OK |
| User ID = UID-usr3 |
| Chained-AF ID = CID-chain2 |
| Chained-AF Result = Result-chain2-zone2 |

FIG.90

| Packet Type = Get Node Resource Info Request |
|---|
| Number of Spots = Num-chain2-zone1-spot |
| Spot ID List = List-chain2-zone1-sid |

FIG.91

| Packet Type = Get Node Resource Info Response |
|---|
| Status = OK |
| Number of Spot Entries = Num-chain2-zone1-spot |
| Spot ID = SID-zone1-spot1 |
| Resource Info = Info-zone1-spot1-res |
| . . . |
| Spot ID = SID-zone1-spotN |
| Resource Info = Info-zone1-spotN-res |

FIG.92

| Packet Type = Deploy AF Request |
|---|
| User ID = UID-usr3 |
| Chained-AF ID = CID-chain2 |
| Chained-AF Info = Info-chain2-zone1 |

FIG.93

| Packet Type = Deploy AF Response |
|---|
| Status = OK |
| User ID = UID-usr3 |
| Chained-AF ID = CID-chain2 |
| Chained-AF Result = Result-chain2-zone1 |

FIG.94

| Packet Type = Deploy Chained-AF Response |
| --- |
| Status = OK |
| User ID = UID-usr3 |
| Chained-AF ID = CID-chain2 |
| Chained-AF Result = Result-chain2 |

FIG.95

| Packet Type = Deploy Application Response |
| --- |
| Status = OK |
| Chained-AF Result = Result-chain2 |

FIG.96

| Number of Chained-AFs = 1 |
|---|
| Chained-AF ID = CID-chain2 |
| Chained-AF Info = Info-chain2 |

FIG.97

| Number of Users = 3 |
|---|
| User ID = UID-usr1 |
| Number of Service Tickets = 1 |
| Service Ticket = STicket-usr1-write-afcat1 |
| User ID = UID-usr2 |
| Number of Service Tickets = 3 |
| Service Ticket = STicket-usr2-read-afcat1 |
| Service Ticket = STicket-usr2-read-afcat2 |
| Service Ticket = STicket-usr2-write-chaincat1 |
| User ID = UID-usr3 |
| Number of Service Tickets = 5 |
| Service Ticket = STicket-usr3-read-chaincat1 |
| Service Ticket = STicket-usr3-est-orch1 |
| Service Ticket = STicket-usr3-est-orch2 |
| Service Ticket = STicket-usr3-deploy-orch1 |
| Service Ticket = STicket-usr3-deploy-orch2 |
| Number of Estimate Entries = 1 |
| Chained-AF Info = Info-chain2 |
| Chained-AF Estimate = Estimate-chain2 |

| Packet Type = Accounting |
|---|
| User ID = UID-usr3 |
| Zone ID = ZID-zone1 |
| Spot ID = SID-spot1 |
| Chained-AF ID = CID-chain2 |
| AF ID = AFID-af1 |
| Usage = Usage-usr3-af1 |

COMMUNICATION DEVICE AND COMMUNICATION METHOD

CROSS REFERENCE TO RELATED APPLICATIONS

This application is a U.S. National Phase of International Patent Application No. PCT/JP2021/003861 filed on Feb. 3, 2021, which claims priority benefit of Japanese Patent Application No. JP 2020-025501 filed in the Japan Patent Office on Feb. 18, 2020. Each of the above-referenced applications is hereby incorporated herein by reference in its entirety.

FIELD

The present disclosure relates to a communication device and a communication method.

BACKGROUND

In conventional technologies, a core part of a communication network is constituted by using dedicated hardware. However, there is a vision of implementing a network function of the dedicated hardware by using software so as to allow the function to be operated on general-purpose hardware. This vision is referred to as Network Functions Virtualization (NFV), and the network function implemented by software is referred to as a Virtualized Network Function (VNF). In the NFV, one or more VNFs are set to continuously act on packets flowing through the network.

A management function and an adjustment function required for constructing an NFV environment are referred to as Management and Orchestration (MANO). Non Patent Literature 1 describes a NFV-MANO architecture proposed by the European Telecommunications Standards Institute (ETSI).

On the other hand, from the viewpoint of a network operator or a service provider, an operation including transferring a packet transferred in a network to a server device that is not included in original packet transfer routes as necessary and setting a Service Function (SF) operating on the server device to act on the packet is referred to as Service Function Chaining (SFC). Examples of the SF include a Network Address Translation (NAT), a load balancer, and a Web Application Firewall (WAF).

Non Patent Literature 2 and 3 describe SFC architectures. In addition, Patent Literature 1 describes a method of autonomously and dispersedly performing failure detection and failure recovery regarding a device or a link in order to enhance availability of a virtualized network service function.

However, in the SFC, SF such as a WAF or a load balancer is prepared from the viewpoint of a network operator or a service provider. That is, what packet is to be subjected to SFC is determined by the intention of the network operator or the service provider.

To handle this, there is proposed a mechanism referred to as Application Function Chaining (AFC) in which one application is divided into a plurality of modules (application functions (AF)) and deployed in one or a plurality of computers in a network, and the application is executed by setting the AF desired by a service user to act on a packet flowing in the network. AF is also defined in the 5th Generation (5G) system architecture stipulated by the 3rd Generation Partnership Project (3GPP) described in Non Patent Literature 4.

Note that one or more AFs which are chained with each other are referred to as Chained-AF. The Chained-AF corresponds to an application provided on the AFC.

CITATION LIST

Patent Literature

Patent Literature 1: JP 2016-046736 A

Non Patent Literature

Non Patent Literature 1: ETSI. Network Functions Virtualization (NFV); Management and Orchestration, December 2014. ETSI GS NFV-MAN 001, V1.1.1 (2014-12).

Non Patent Literature 2: J. Halpern and C. Pignataro. Service Function Chaining (SFC) Architecture, October 2015. RFC 7665.

Non Patent Literature 3: Tomonori SATO, Hiroki WATANABE, Kazuki HAYASHI, Takao KONDO, and Fumio TERAOKA. Application Function Chaining Infrastructure for a 5G Core Network. Research report of Information Processing Society of Japan, Vol. 2019-DPS-180, No-18, September 2019.

Non Patent Literature 4: 3GPP. 3rd Generation Partnership Project; Technical Specification Group Services and System Aspects; System architecture for the 5G System (5GS); Stage 2 (Release 16), December 2019. 3GPP TS 23.501, V16.3.0 (2019-12).

SUMMARY

Technical Problem

However, although the NFV and the AFC are similar in that a software module is set to act on a packet flowing in a network, a MANO (AFC-MANO) for constructing an AFC environment has not been proposed.

In view of this, the present disclosure proposes a novel and improved communication device and communication method capable of achieving AFC-MANO.

Solution to Problem

According to the present disclosure, a communication device that operates as a management node in a first zone being a management domain on a network, the communication device includes: a communication unit that executes communication with another node; and a control unit that controls communication executed by the communication unit, wherein the control unit operates such that, when having received, from a user, a request regarding an application that chains one or more application functions (AFs) to act on a packet flowing in the network, the control unit acquires information regarding the application from a second zone that is a management domain other than the first zone, and then calculates a deployment destination of the AF in the network including the first zone and the second zone based on the information.

According to the present disclosure, a communication device that operates as a management node in a first zone being a management domain on a network, the communication device includes: a communication unit that executes communication with another node; a control unit that controls communication executed by the communication unit, wherein the first zone includes one or more resource bases each including one or more nodes that set one or more application functions (AFs) to act on a packet flowing through the network, in response to a request of a user, and the control unit calculates a deployment destination of the AF in the first zone based on resource information collected from each of the resource bases.

According to the present disclosure, a communication method using a communication device that operates as a management node in a first zone being a management domain on a network, the communication method includes: executing communication with another node; and controlling communication with the another node, wherein the controlling includes operations such that, when having received, from a user, a request regarding an application that chains one or more application functions (AFs) to act on a packet flowing in the network, information regarding the application is acquired from a second zone being a management domain other than the first zone, and then a deployment destination of the AFs in the network including the first zone and the second zone is calculated based on the information.

According to the present disclosure, a communication method using a communication device that operates as a management node in a first zone being a management domain on a network, the communication method includes: executing communication with another node; controlling communication with the another node, wherein the first zone includes one or more resource bases each including one or more nodes that set one or more application functions (AFs) to act on a packet flowing through the network, in response to a request of a user, and the controlling includes calculating a deployment destination of the AF in the first zone based on resource information collected from each of the resource bases.

BRIEF DESCRIPTION OF DRAWINGS

FIG. 7 is a diagram illustrating a structure example of a Subscribe Response packet.

FIG. 8 is a diagram illustrating a structure example of a Publish Request packet.

FIG. 9 is a diagram illustrating a structure example of a Publish Response packet.

FIG. 10 is a diagram illustrating a structure example of a Subscribe Notification packet.

FIG. 11 is a diagram illustrating a structure example of a table held by a Spot Manager after collection of computing resource information.

FIG. 12 is a diagram illustrating a structure example of a table held by Zone Manager after collection of computing resource information.

FIG. 14 is a diagram illustrating a structure example of a Publish Request packet.

FIG. 15 is a diagram illustrating a structure example of a Subscribe Notification packet.

FIG. 16 is a diagram illustrating a structure example of a table held by the Spot Manager of Spot1 after collection of network resource information.

FIG. 17 is a diagram illustrating a structure example of a table held by the Spot Manager of Spot2 after collection of network resource information.

FIG. 18 is a diagram illustrating a structure example of a table held by the Zone Manager after collection of network resource information.

FIG. 20 is a diagram illustrating a structure example of a Register AF Request packet.

FIG. 21 is a diagram illustrating a structure example of a User AA Request packet.

FIG. 22 is a diagram illustrating a structure example of a User AA Response packet.

FIG. 23 is a diagram illustrating a structure example of a Register AF Response packet.

FIG. 24 is a diagram illustrating a structure example of an Upload AF Request packet.

FIG. 25 is a diagram illustrating a part of AF Data.

FIG. 26 is a diagram illustrating a structure example of a Store AF Request packet.

FIG. 27 is a diagram illustrating a structure example of a Store AF Response packet.

FIG. 28 is a diagram illustrating a structure example of an Upload AF Response packet.

FIG. 29 is a diagram illustrating a structure example of a table held by an AF Catalog in Zone 1 after registration of AF.

FIG. 30 is a diagram illustrating a structure example of a table held by an OSS/BSS in Zone 1 after registration of AF.

FIG. 32 is a diagram illustrating a structure example of a Show AF Request packet.

FIG. 33 is a diagram illustrating a structure example of a User AA Request packet.

FIG. 34 is a diagram illustrating a structure example of an External User AA Request packet.

FIG. 35 is a diagram illustrating a structure example of an External User AA Response packet.

FIG. 36 is a diagram illustrating a structure example of a User AA Response packet.

FIG. 37 is a diagram illustrating a structure example of a Search External AF Request packet.

FIG. 38 is a diagram illustrating a structure example of a Search AF Request packet.

FIG. 39 is a diagram illustrating a structure example of a Search AF Response packet.

FIG. 40 is a diagram illustrating a structure example of a Search External AF Response packet.

FIG. 41 is a diagram illustrating a structure example of a Search AF Request packet.

FIG. 42 is a diagram illustrating a structure example of a Search AF Response packet.

FIG. 43 is a diagram illustrating a structure example of a Show AF Response packet.

FIG. 44 is a diagram illustrating a structure example of a Register Chained-AF Request packet.

FIG. 45 is a diagram illustrating a part of Chained-AF Data.

FIG. 46 is a diagram illustrating a structure example of a User AA Request packet.

FIG. 47 is a diagram illustrating a structure example of a User AA Response packet.

FIG. 48 is a diagram illustrating a structure example of a Store Chained-AF Request packet.

FIG. 49 is a diagram illustrating a structure example of a Store Chained-AF Response packet.

FIG. 50 is a diagram illustrating a structure example of a Register Chained-AF Response packet.

FIG. 51 is a diagram illustrating a structure example of a table held by a Chain Catalog in Zone 1 after registration of Chained-AF.

FIG. 52 is a diagram illustrating a structure example of a table held by an OSS/BSS in Zone 1 after registration of Chained-AF.

FIG. 54 is a diagram illustrating a structure example of a Show Chained-AF Request packet.

FIG. 55 is a diagram illustrating a structure example of a User AA Request packet.

FIG. 56 is a diagram illustrating a structure example of a User AA Response packet.

FIG. 57 is a diagram illustrating a structure example of a Search Chained-AF Request packet.

FIG. 58 is a diagram illustrating a structure example of a Search Chained-AF Response packet.

FIG. 59 is a diagram illustrating a structure example of a Show Chained-AF Response packet.

FIG. 60 is a diagram illustrating a structure example of an Estimate Application Request packet.

FIG. 61 is a diagram illustrating a structure example of a User AA Request packet.

FIG. 62 is a diagram illustrating a structure example of an External User AA Request packet.

FIG. 63 is a diagram illustrating a structure example of an External User AA Response packet.

FIG. 64 is a diagram illustrating a structure example of a User AA Response packet.

FIG. 65 is a diagram illustrating a structure example of a Get Chained-AF Info Request packet.

FIG. 66 is a diagram illustrating a structure example of a Get Chained-AF Info Response packet.

FIG. 67 is a diagram illustrating a structure example of an Estimate Chained-AF Request packet.

FIG. 68 is a diagram illustrating a structure example of an Estimate External AF Request packet.

FIG. 69 is a diagram illustrating a structure example of a Get Spot Resource Info Request packet.

FIG. 70 is a diagram illustrating a structure example of a Get Spot Resource Info Response packet.

FIG. 71 is a diagram illustrating a structure example of an Estimate External AF Response packet.

FIG. 72 is a diagram illustrating a structure example of a Get Spot Resource Info Response packet.

FIG. 73 is a diagram illustrating a structure example of an Estimate Chained-AF Response packet.

FIG. 74 is a diagram illustrating a structure example of an Estimate Application Response packet.

FIG. 75 is a diagram illustrating a structure example of a table held by an Orchestrator in Zone 1 after Chained-AF execution cost estimate acquisition.

FIG. 76 is a diagram illustrating a structure example of a table held by an OSS/BSS in Zone 1 after Chained-AF execution cost estimate acquisition.

FIG. 78 is a diagram illustrating a structure example of a Deploy Application Request packet.

FIG. 79 is a diagram illustrating a structure example of a User AA Request packet.

FIG. 80 is a diagram illustrating a structure example of an External User AA Request packet.

FIG. 81 is a diagram illustrating a structure example of an External User AA Response packet.

FIG. 82 is a diagram illustrating a structure example of a User AA Response packet.

FIG. 83 is a diagram illustrating a structure example of a Deploy Chained-AF Request packet.

FIG. 84 is a diagram illustrating a structure example of a Deploy External AF Request packet.

FIG. 85 is a diagram illustrating a structure example of a Get Node Resource Info Request packet.

FIG. 86 is a diagram illustrating a structure example of a Get Node Resource Info Response packet.

FIG. 87 is a diagram illustrating a structure example of a Deploy AF Request packet.

FIG. 88 is a diagram illustrating a structure example of a Deploy AF Response packet.

FIG. 89 is a diagram illustrating a structure example of a Deploy External AF Response packet.

FIG. 90 is a diagram illustrating a structure example of a Get Node Resource Info Request packet.

FIG. 91 is a diagram illustrating a structure example of a Get Node Resource Info Response packet.

FIG. 92 is a diagram illustrating a structure example of a Deploy AF Request packet.

FIG. 93 is a diagram illustrating a structure example of a Deploy AF Response packet.

FIG. 94 is a diagram illustrating a structure example of a Deploy Chained-AF Response packet.

FIG. 95 is a diagram illustrating a structure example of a Deploy Application Response packet.

FIG. 96 is a diagram illustrating a structure example of a table held by an Orchestrator in Zone 1 after installation of Chained-AF.

FIG. 97 is a diagram illustrating a structure example of a table held by an OSS/BSS in Zone 1 after installation of Chained-AF.

DESCRIPTION OF EMBODIMENTS

Preferred embodiments of the present disclosure will be described in detail hereinbelow with reference to the accompanying drawings. Note that redundant descriptions will be omitted from the present specification and the drawings by assigning the same reference signs to components having substantially the same functional configuration.

Note that the description will be provided in the following order.

1. Embodiments of present disclosure
   1.1. Problems in achieving AFC-MANO
   1.2. Overall architecture example of AFC
   1.3. Specific description of AFC 1.3.1. Computing resource information collection procedure
1.3.2. Network resource Information collection procedure
1.3.3. AF registration procedure
1.3.4. Chained-AF registration procedure
1.3.5. Chained-AF execution cost estimate acquisition procedure
1.3.6. Chained-AF installation procedure
1.3.7. Chained-AF accounting procedure
1.4. Functional configuration example of communication device
2. Summary
2.1. Effects

1. EMBODIMENTS OF PRESENT DISCLOSURE

[1.1. Problems in Achieving AFC-MANO]

Figure 1:
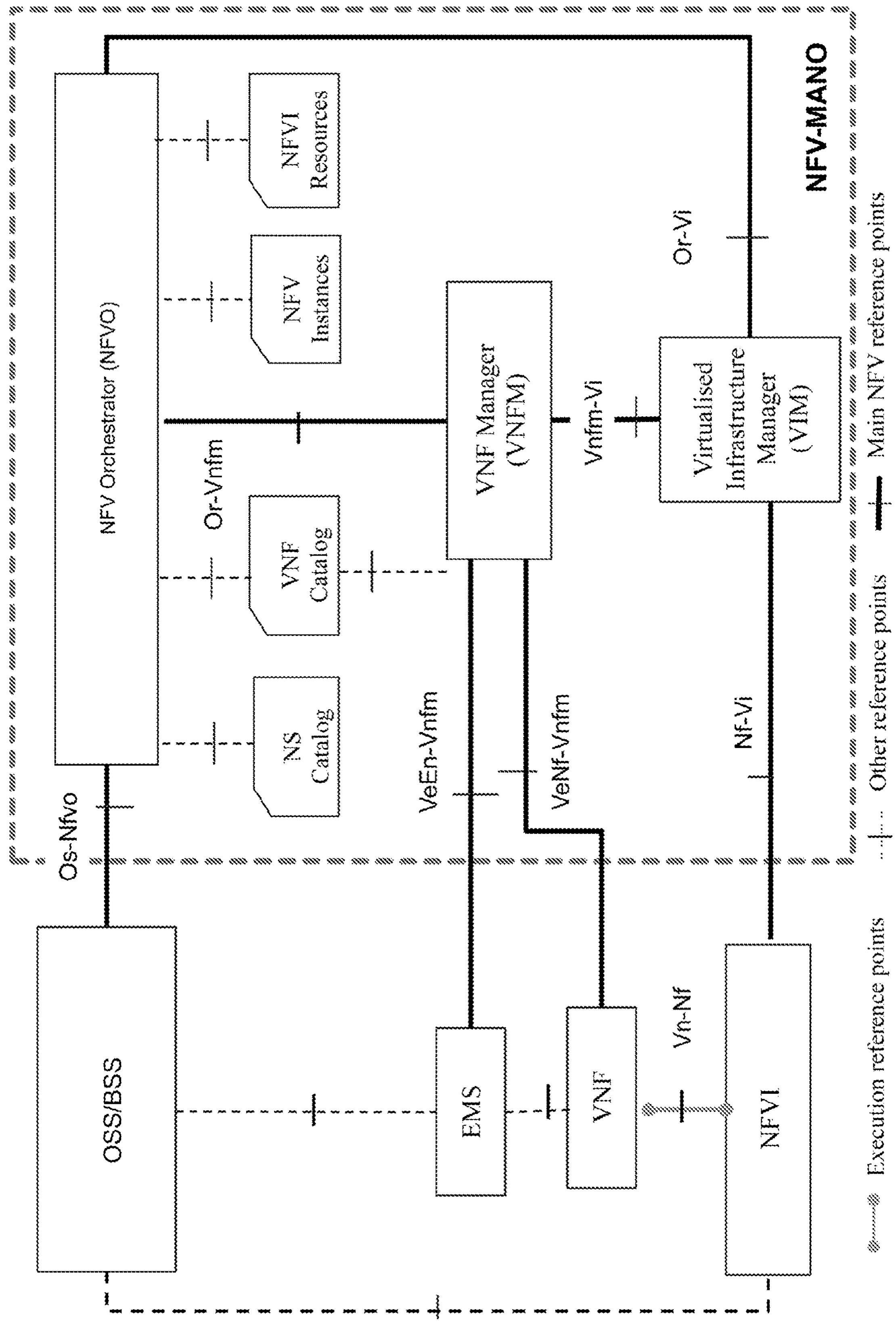
FIG. 1 is a diagram illustrating an example of a NFV-MANO architecture disclosed in Non Patent Literature 1.
Figure 2:
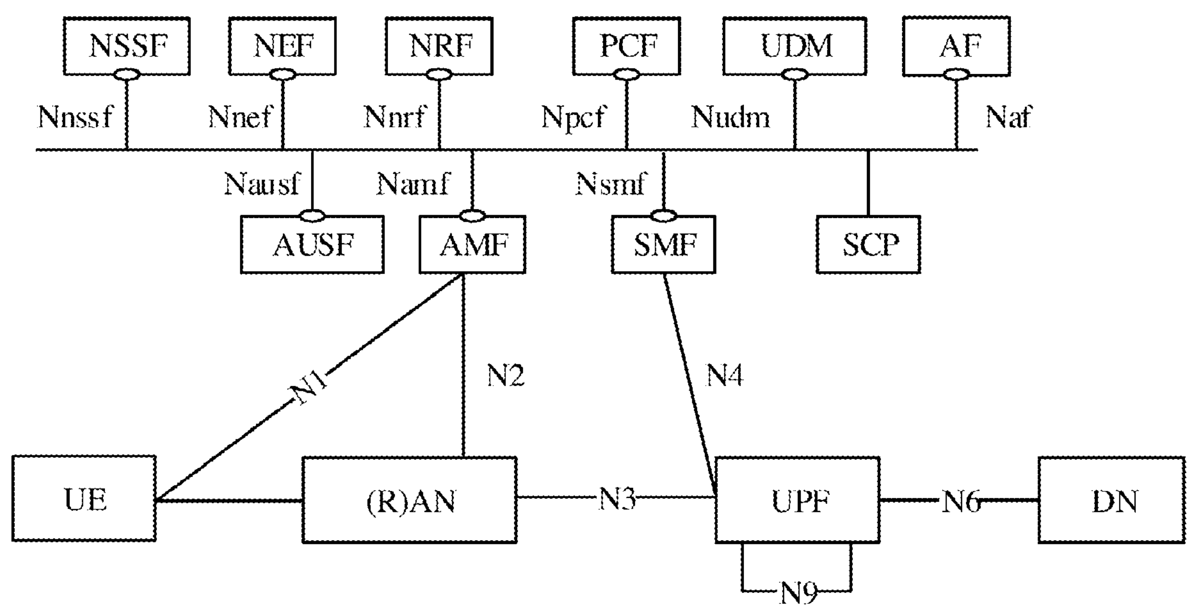
FIG. 2 is a diagram illustrating an example of a 5G system architecture disclosed in Non Patent Literature 4.

Before describing an embodiment of the present disclosure in detail, problems in achieving the AFC-MANO will be specifically described. FIG. 1 is a diagram illustrating an example of a NFV-MANO architecture disclosed in Non Patent Literature 1. FIG. 2 is a diagram illustrating an example of a 5G system architecture disclosed in Non Patent Literature 4.

In achieving the AFC-MANO, it is conceivable to follow the NFV-MANO as illustrated in FIG. 1. In that case, however, there would be the following problems.

(a)

AFC assumes operation in a plurality of management domains. In addition, AFC assumes operation in a plurality of computing resource bases (for example, data centers) in one management domain. In comparison, NFV-MANO considers a plurality of management domains, but does not consider a plurality of computing resource bases in one management domain. That is, NFV-MANO does not consider geographically dispersed computing resource bases. Therefore, NFV-MANO does not consider the bandwidth or latency in the network.

(b)

Although AFC registers AF developed by a user being an "AF Developer" to an AFC domain, NFV-MANO cannot register VNF developed by the user to a NFV domain.

(c)

Although AFC enables the user being a Chained-AF Developer to chain the AFs registered in the AFC domain and to register the Chained-AF in the AFC domain, NFV-MANO does not enable the user to define the chaining of VNFs.

(d)

Although AFC enables deployment of the AF according to the request of the user being a Chained-AF User, the NFV-MANO cannot deploy the VNFs according to the request of the user.

(e)

Although AFC considers authentication, authorization, and use history information collection (also referred to as Authentication, Authorization, and Accounting (AAA)) of the AFC user, NFV-MANO does not consider AAA.

(f)

Although the AFC determines deployment of the AF in consideration of the geographical position of the user, the NFV-MANO does not consider the geographical position of the user.

FIG. 2 illustrates an example of a 5G system architecture stipulated by 3GPP in which AF is defined, but this architecture includes the following problems.

(g)

In the AFC, the AF belongs to a user plane and processes packet data, but AF in 5G belongs to a control plane and does not process packet data.

The following will give a specific configuration example of AFC for solving these problems and achieving the AFC-MANO.

[1.2. Overall Architecture Example of AFC]

Figure 3:
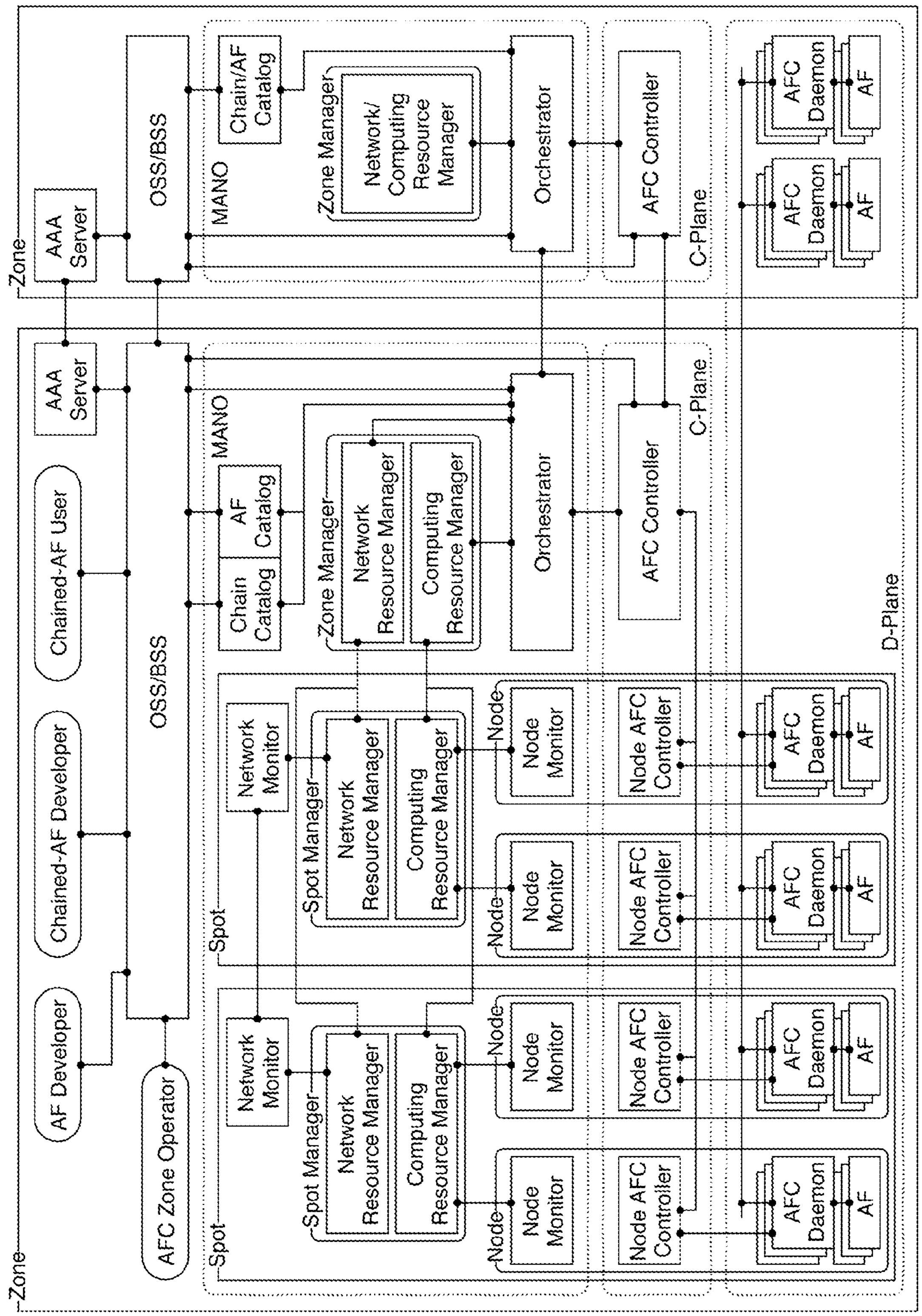
FIG. 3 is a diagram illustrating an overall AFC architecture proposed in an embodiment of the present disclosure.
Figure 4:
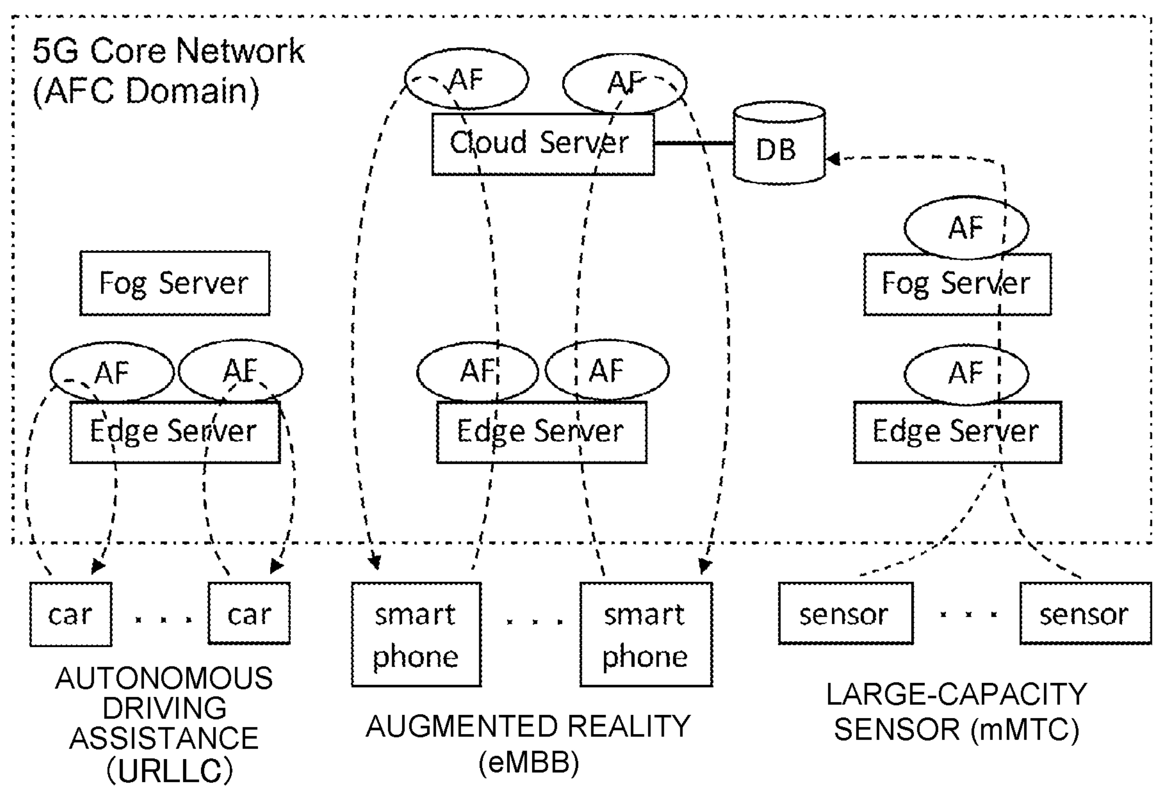
FIG. 4 is a diagram illustrating an example of Chained-AF disclosed in Non Patent Literature 3.

FIG. 3 is a diagram illustrating an overall AFC architecture proposed in an embodiment of the present disclosure. FIG. 4 is a diagram illustrating an example of Chained-AF disclosed in Non Patent Literature 3.

As illustrated in FIG. 3, a management domain in AFC is referred to as a "Zone". An example of the zone can be a company that provides the AFC as a service. In addition, the computing resource base is referred to as a "Spot". Examples of the Spot include an edge server installed at an edge of a data center or a network.

FIG. 3 includes two Zones. While the inside of the Zone on the left side is described in detail, the inside of the Zone on the right side is simplified. The Zone on the left includes two Spots. One Zone includes one "Zone Manager" which manages computing resources, network resources, AF, and Chained-AF in the Zone.

Zone Manager includes a "Network Resource Manager" and a "Computing Resource Manager" which manage network resources and computing resources, respectively.

One Zone includes one "Orchestrator", which manages a life cycle of AF and Chained-AF, and determines which Spot is to be used to deploy the AF constituting Chained-AF when installing Chained-AF.

In addition, one Zone includes one "AFC Controller" which performs activation/termination of the AF in the Zone and installation/deletion of the Chained-AF. In addition, one Zone includes one "AF Catalog" which stores an available AF. In addition, one Zone includes one "Chain Catalog" which stores configuration information regarding an available Chained-AF.

In addition, one Zone includes one "AAA Server" which performs authentication, authorization, and collection of use history information regarding the user. In addition, one Zone includes one "Operation Support System/Business Support System (OSS/BSS)" which performs service management, user management, and the like. Note that "one" in the above means a logically one unit, and for example, a plurality of equivalent modules may exist physically for fault tolerance.

An "AFC Zone Operator" is a person who manages and operates the AFC Zone. Furthermore, an "AF Developer" is a person who develops AF and registers AF in the AFC Zone. In addition, a "Chained-AF Developer" is a person who performs creation of and registration of Chained-AF to the AFC Zone. A "Chained-AF User" is a person who uses the Chained-AF as an application. All of the AFC Zone Manager, AF Developer, Chained-AF Developer, and Chained-AF User may be an identical person, some of them may be an identical person, or they may each be different persons.

One Spot includes one "Spot Manager" which manages computing resources, network resources, AF, and Chained-AF in the Spot. Spot Manager includes a "Network Resource Manager" and a "Computing Resource Manager" which manage network resources and computing resources, respectively.

In addition, one Spot includes one "Network Monitor" which measures a network status (for example, latency, use band, and the like) between the Spot and another Spot. In addition, one Spot includes a plurality of "Nodes (for example, computers)". In FIG. 3, one Spot includes two Nodes.

One Node includes One "Node Monitor" which measures the use status of the computing resources in the Node. In addition, one Node includes one "Node AFC Controller" which performs activation and termination of AF in the Node and installation as well as deletion of Chained-AF. Note that "one" in the above means a logically one unit, and for example, a plurality of equivalent modules may exist physically for fault tolerance.

In addition, one or more pairs of "AFC Daemon" and AF are activated in one Node in response to a request. The AFC Daemon manages connections (chains) between AF.

From the viewpoint of a network configuration, the AFC architecture is divided into three Planes, namely, a MANO Plane, a Control Plane (C-Plane), and a Data Plane (D-Plane).

The MANO Plane includes a Zone Manager, an Orchestrator, an AF Catalog, a Chain Catalog, a Spot Manager, a Network Monitor, and a Node Monitor. The C-Plane includes an AFC Controller and a Node AFC Controller. The D-Plane includes AFC Daemon and AF.

Examples of Chained-AF include autonomous driving assistance, augmented reality (AR), and data collection from large-capacity sensors. 5G has features of Ultra-Reliable and Low Latency Communications (URLLC), enhanced Mobile Broadband (eMBB), and massive Machine Type Communications (mMTC).

Autonomous driving assistance uses URLLC. Augmented reality uses eMBB. In addition, data collection from large-capacity sensors uses mMTC.

For example, as illustrated in FIG. 4, in order to achieve autonomous driving assistance, AF is deployed at an "Edge Server" installed in the periphery of the network in consideration of low latency, thereby constituting the Chained-AF. Furthermore, in order to achieve augmented reality, an AF that performs low load processing such as viewpoint detection of a user is deployed at the Edge Server, while an AF that performs high load processing such as image rendering is deployed at a "Cloud Server" installed in a data center or the like, thereby constituting the Chained-AF. In addition, in order to collect data from the large-capacity sensor, an AF that aggregates data from the sensors is deployed at an Edge Server, and an AF that performs calculation across sensor data is deployed at a "Fog Server" installed inside the network, for example, so as to constitute the Chained-AF, and finally, the data is to be stored in a database on a Cloud Server.

[1.3. Specific Description of AFC]

(1.3.1. Computing Resource Information Collection Procedure)

Figure 5:
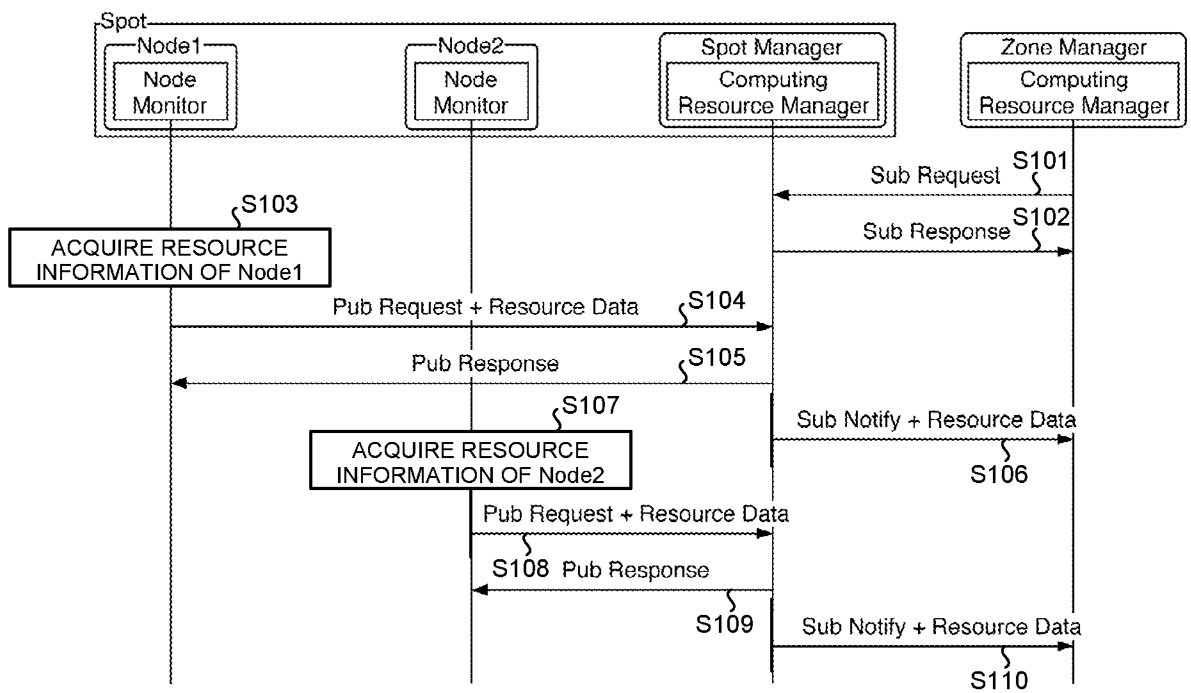
FIG. 5 is a diagram illustrating a processing procedure regarding computing resource information collection processing.

Next, a procedure of collecting computing resource information by a Zone Manager will be described with reference to FIG. 5. FIG. 5 is a diagram illustrating a processing procedure regarding computing resource information collection processing. Note that FIG. 5 illustrates a procedure used by the Zone Manager to collect computing resource information regarding one Spot including two nodes "Node1" and "Node2".

Here, the Spot has an identifier "SID-spot1". Furthermore, Node1 has an identifier "NID-node1". Furthermore, Node2 has an identifier "NID-node2". In addition, the computing resource information in Node1 is described as "Resource-com-node1". In addition, the computing resource information in Node2 is described as "Resource-com-node2".

Figure 6:
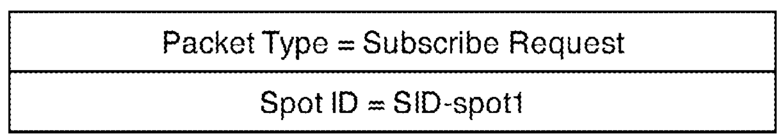
FIG. 6 is a diagram illustrating a structure example of a Subscribe Request packet.

First, the Computing Resource Manager in the Zone Manager transmits a Subscribe Request packet illustrated in FIG. 6 to the Computing Resource Manager in the Spot Manager (Step S101).

The Subscribe Request packet includes information as follows. The Packet Type field has a value "Subscribe Request". The Spot ID field has a value "SID-spot1".

When having received the Subscribe Request packet, the Computing Resource Manager in the Spot Manager returns a Subscribe Response packet illustrated in FIG. 7 to the Computing Resource Manager in the Zone Manager (Step S102).

The Subscribe Response packet includes information as follows. The Packet Type field has a value "Subscribe Response". The Status field has a value "OK" indicating normal processing.

Meanwhile, the Node Monitor in Node1 periodically acquires computing resource information (Step S103). Subsequently, the Node Monitor in Node1 transmits a Publish Request packet illustrated in FIG. 8 to the Computing Resource Manager in the Spot Manager (Step S104).

The Publish Request packet includes information as follows. The Packet Type field has a value "Publish Request". The Node ID field has a value "NID-node1". The Resource Data field has a value "Resource-comp-node1".

When having received the Publish Request packet, the Computing Resource Manager in the Spot Manager stores the computing resource information in its own node, and returns a Publish Response packet illustrated in FIG. 9 to the Node Monitor in Node1 (Step S105).

The Publish Response packet includes information as follows. The Packet Type field has a value "Publish Response". The Status field has a value "OK" indicating normal processing.

Next, the Computing Resource Manager in the Spot Manager transmits a Subscribe Notification packet illustrated in FIG. 10 to the Computing Resource Manager in the Zone Manager (Step S106).

The Subscribe Notification packet includes information as follows: The Packet Type field has a value "Subscribe Notification". The Spot ID field has a value "SID-spot1". The Resource Data field has a value "Resource-comp-spot1".

Furthermore, processing similar to the processing in Steps S103 to S106 is performed for Node2 (Steps S107 to S110).

As a result of this computing resource information collection processing, the Spot Manager holds a table illustrated in FIG. 11. The Number of Node Entries field holds the number of nodes in Spot. In this example, the value is "2". This is followed by two sets of Node ID field and ResourceData field. The Node ID field holds an identifier of the node, while the Resource Data field holds computing resource information regarding the node. In this example, the first Node ID field has a value "NID-node1". The first Resource Data field has a value "Resource-comp-node1". The second Node ID field has a value "NID-node2". The second Resource Data field has a value "Resource-comp-node2".

In addition, the Zone Manager holds a table illustrated in FIG. 12. The Number of Spot Entries field holds the number of Spots in the Zone. In this example, the value is "1". This is followed by a set of the Spot ID field and the Resource Data field. The Spot ID field holds an identifier of the Spot, while the Resource Data field holds computing resource information. In this example, the Spot ID field has a value "SID-spot1". The Resource Data field has a value "Resource-comp-spot1".

(1.3.2. Network Resource Information Collection Procedure)

Figure 13:
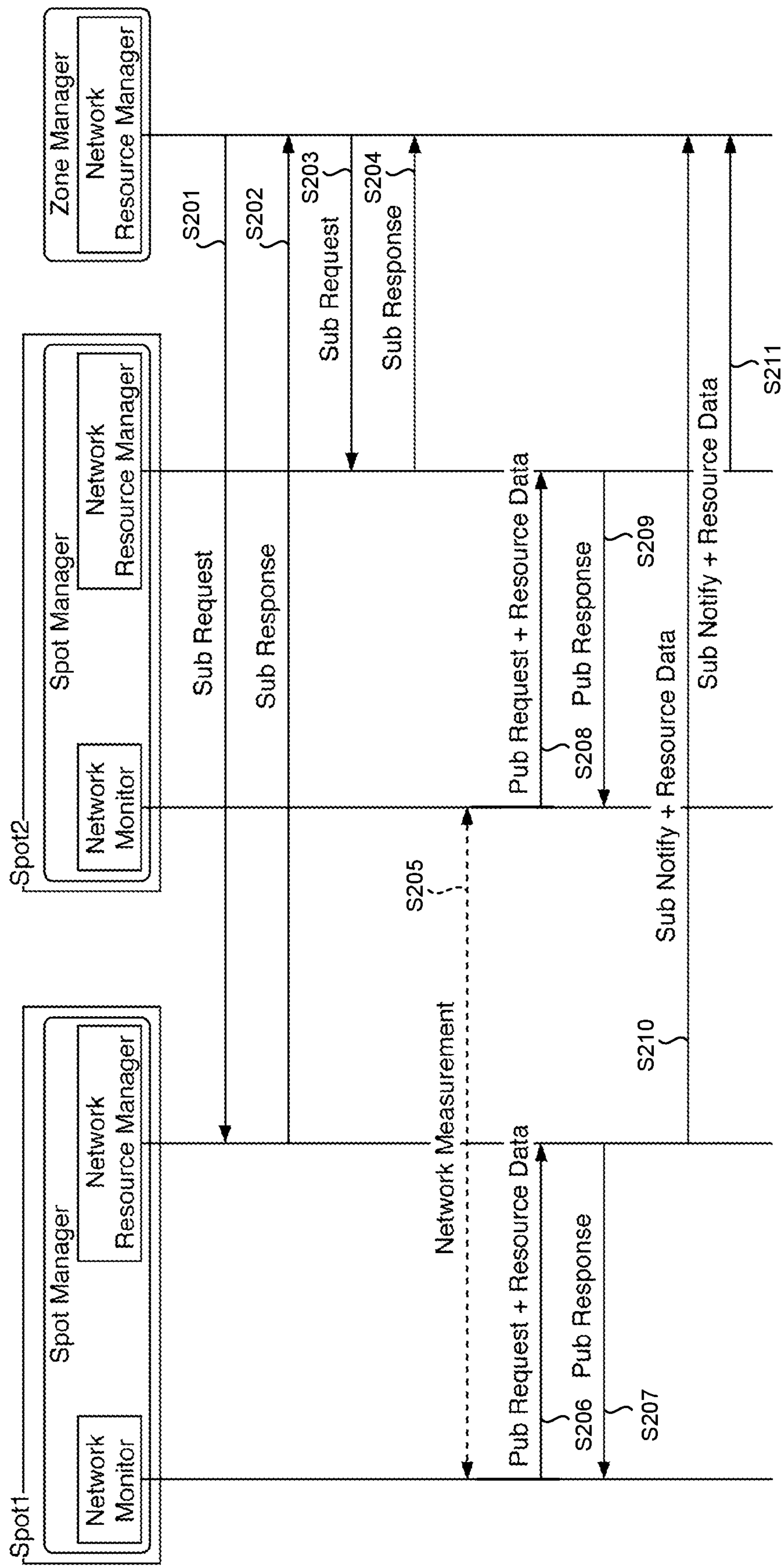
FIG. 13 is a diagram illustrating a processing procedure regarding network resource information collection processing.

Next, a procedure of collecting network resource information by a Zone Manager will be described with reference to FIG. 13. FIG. 13 is a diagram illustrating a processing procedure regarding network resource information collection processing. Note that FIG. 13 illustrates a procedure in which the Network Resource Manager in the Zone collects the network resource information exchanged between Spot1 and Spot2.

Here, the Spot1 has an identifier "SID-spot1". In addition, the Spot2 has an identifier "SID-spot2". Furthermore, the network resource information collected by Node1 is described as "Resource-nw-node1". Furthermore, the network resource information collected by Node2 is described as "Resource-nw-node2".

First, the Network Resource Manager in the Zone Manager transmits a Subscribe Request packet illustrated in FIG. 6 to the Network Resource Manager in the Spot Manager of Spot1 (Step S201).

When having received the Subscribe Request packet, the Network Resource Manager in the Spot Manager of Spot1 returns a Subscribe Response packet illustrated in FIG. 7 to the Network Resource Manager in the Zone Manager (Step S202).

In addition, the Network Resource Manager in the Zone Manager also performs the operation similar to Steps S201 and S202 on the Network Resource Manager in the Spot Manager of Spot2 (Steps S203 and S204).

On the other hand, the Network Monitor in the Spot Manager of Spot1 and the Network Monitor in the Spot Manager of Spot2 periodically measure the state of the network (Step S205).

Subsequently, the Network Monitor in the Spot Manager of Spot1 transmits the Publish Request packet illustrated in FIG. 14 to the Network Resource Manager in the Spot Manager of Spot1 (Step S206).

The Publish Request packet includes information as follows. The Packet Type field has a value "Publish Request". The Resource Data field has a value "Resource-nw-spot1".

Subsequently, when having received the Publish Request packet, the Network Resource Manager in the Spot Manager of Spot1 returns a Publish Response packet illustrated in FIG. 9 to the Network Monitor in the Spot Manager of Spot1 (Step S207).

In addition, the Network Resource Manager and the Network Monitor in the Spot Manager of Spot2 also perform processing (Steps S208 and S209) similar to Steps S206 and S207.

Having received the Publish Request packet, the Network Resource Manager in the Spot Manager of Spot1 transmits a Subscribe Notification packet illustrated in FIG. 15 to the Network Resource Manager in the Zone Manager (Step S210).

The Subscribe Notification packet includes information as follows: The Packet Type field has a value "Subscribe Notification". The Spot ID field has a value "SID-spot1". The Resource Data field has a value "Resource-nw-spot1".

In addition, the Network Resource Manager in the Spot Manager of Spot2 also performs processing (Step S211) similar to Step S210.

Figures 16, 17:
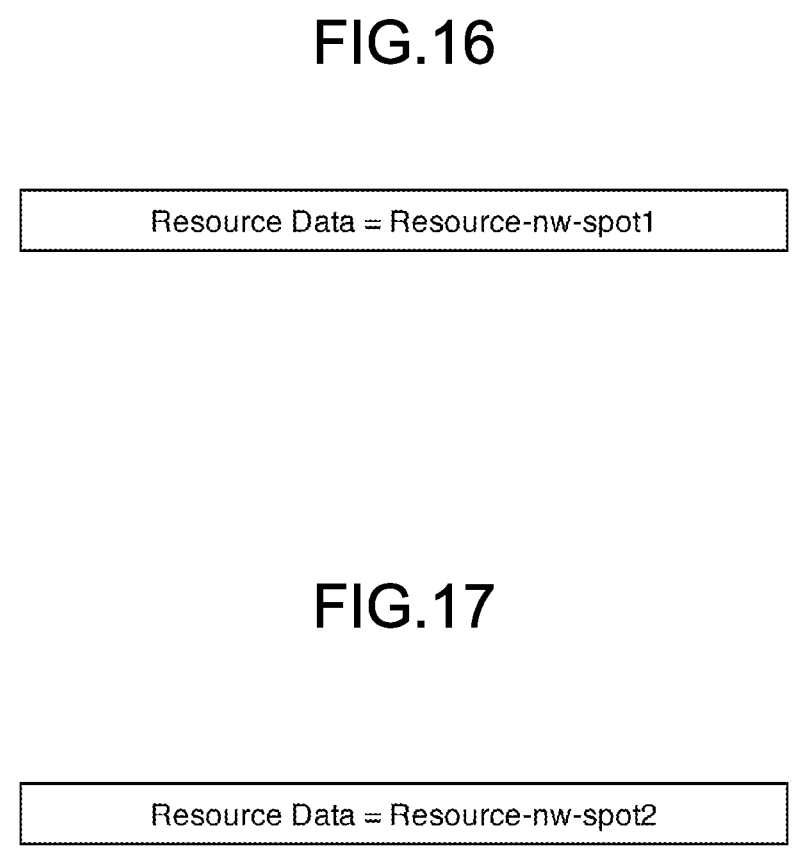

As a result of the network resource information collection processing, the Spot Manager of Spot1 holds a table illustrated in FIG. 16, while the Spot Manager of Spot2 holds a table illustrated in FIG. 17. The Resource Data field holds network resource information. In this example, each of the Resource Data fields has a value "Resource-nw-spot1" and a value "Resource-nw-spot2".

In addition, the Zone Manager holds a table illustrated in FIG. 18. The Number of Spot Entries field holds the number of Spots in the Zone. In this example, the value is "2". This is followed by two sets of the Spot ID field and the Resource Data field. The Spot ID field holds an identifier of the Spot, while the Resource Data field holds network resource information. In this example, the first Spot ID field has a value "SID-spot1". The first Resource Data field has a value "Resource-nw-spot1". The second Spot ID field has a value "SID-spot2". The second Resource Data field has a value "Resource-nw-spot2".

(1.3.3. AF Registration Procedure)

Figure 19:
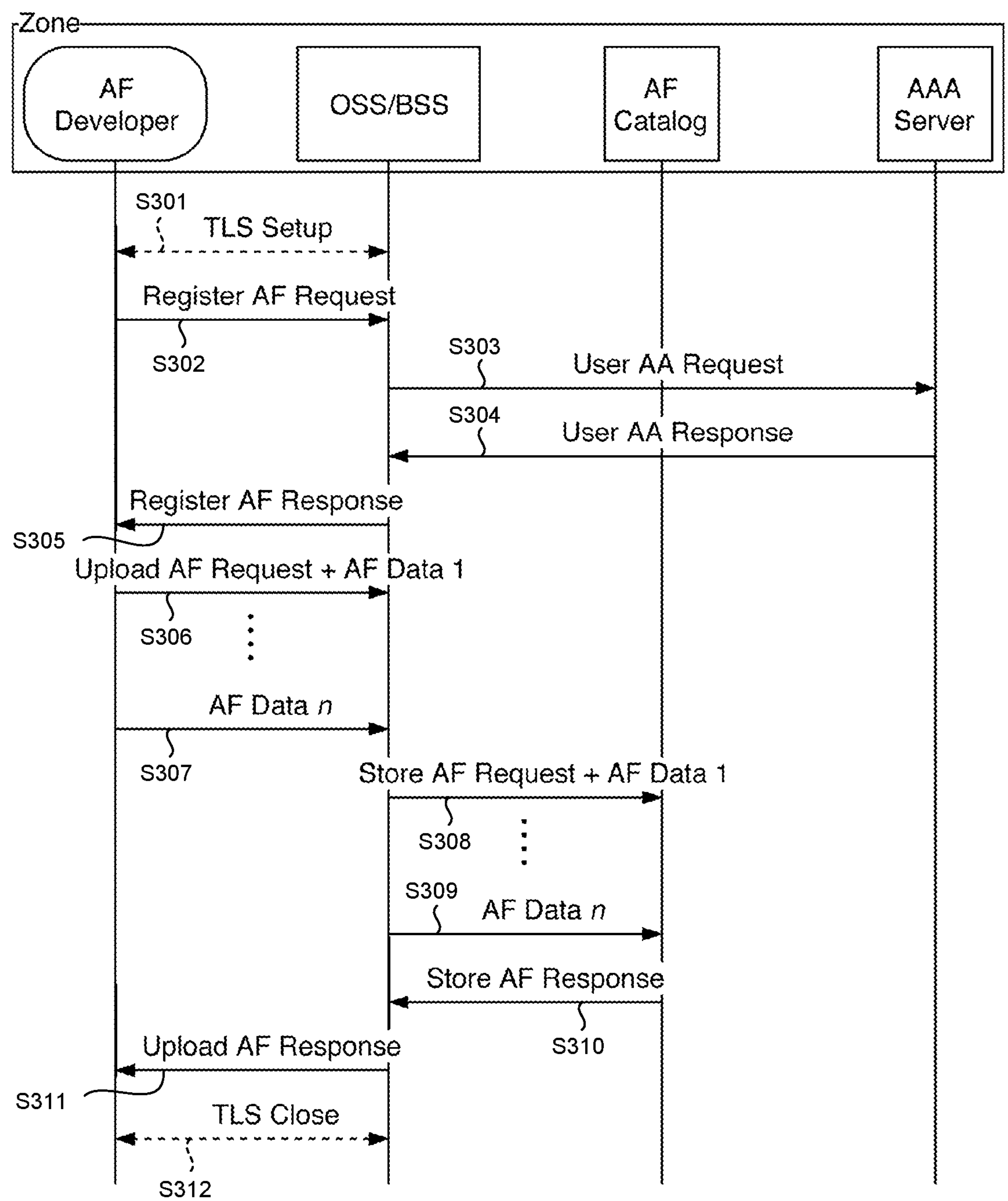
FIG. 19 is a diagram illustrating a processing procedure regarding AF registration processing.

Next, an AF registration procedure will be described with reference to FIG. 19. FIG. 19 is a diagram illustrating a processing procedure regarding AF registration processing. Note that FIG. 19 illustrates a procedure in which the AF Developer in the Zone registers AF in the AF Catalog.

Here, an identifier of the AF Developer is described as "UID-usr1". Furthermore, information for authentication and authorization of the AF Developer is described as "Cred-usr1". Cred-usr1 includes information such as a user name and a password of AF Developer, for example.

Furthermore, a service ticket indicating that AF Developer has authority to write information in AF Catalog is described as "STicket-usr1-write-afcat1". Furthermore, the AF name registered in the AF Catalog by the AF Developer is described as "AFName-af1".

Furthermore, the syntax of this AF is described as AFSyntax-af1. The syntax is, for example, information indicating an argument and a return value at time of activation, and the like. The syntax at the time of activation is an argument, for example. Furthermore, the size of the entity of this AF is described as "Size-af1". Furthermore, the data of the entity of AF is described as "Data-af1". Furthermore, the identifier allocated to this AF is described as "AFID-af1".

First, the AF Developer establishes a control connection referred to as Transport Layer Security (TLS) connection with the OSS/BSS (Step S301).

Subsequently, the AF Developer transmits a Register AF Request packet illustrated in FIG. 20 to the OSS/BSS (Step S302). The Register AF Request packet includes information as follows. The Packet Type field has a value "Register AF Request". The User ID field has a value "UID-usr1". The Credential field has a value "Cred-usr1".

When having received the Register AF Request packet, the OSS/BSS transmits a User AA Request packet illustrated in FIG. 21 to the AAA Server (Step S303).

The User AA Request packet includes information as follows. The Packet Type field has a value "User AA Request". The User ID field has a value "UID-usr1". The Credential field has a value "Cred-usr1". The Action Type field has a value "Write" indicating the type of operation. The Action Target field has a value "AF Catalog" indicating an operation target.

The AAA Server performs authentication and authorization of the AF Developer by the values of the User ID field, the Credential field, the Action Type field, and the Action Target field of the received User AA Request packet. Subsequently, a User AA Response packet illustrated in FIG. 22 is returned to the OSS/BSS (Step S304).

The User AA Response packet includes information as follows. The Packet Type field has a value "User AA Response". The Status field has a value "OK" indicating normal processing. The Service Ticket field has a value "STicket-usr1-write-afcat1".

STicket-usr1-write-afcat1 is generated as follows, for example. A value of the User ID field, a value of the Action Type field, a value of the Action Target field, and a value of the current time of the User AA Request packet are concatenated, and then an electronic signature is applied the concatenated values using a secret key of the AAA Server.

When having received the User AA Response packet, the OSS/BSS returns a Register AF Response packet illustrated in FIG. 23 to the AF Developer (Step S305). The Register AF Response packet includes information as follows. The Packet Type field has a value "Register AF Response". The Status field has a value "OK" indicating normal processing.

When having received the Register AF Response packet, the AF Developer transmits an Upload AF Request packet illustrated in FIG. 24 to the OSS/BSS (Step S306).

The Upload AF Request packet includes information as follows. The Packet Type field has a value "Upload AF Request". The User ID field has a value "UID-usr1". The AF Name field has a value "AFName-af1". The AF Syntax field has a value "AFSyntax-af1". The AF Size field has a value "Size-af1". The AF Data field has a value "Data-af1".

In a case where the entity of AF exceeds the capacity of one packet, Data-af1 is divided into a plurality of pieces and transmitted as illustrated in FIG. 25 (Step S307). In this example, the data is transmitted in n divided pieces.

When having received an Upload AF Request packet and all AF entities, the OSS/BSS transmits a Store AF Request packet illustrated in FIG. 26 to the AF Catalog (Step S308).

The Store AF Request packet includes information as follows. The Packet Type field has a value "Store AF Request". The User ID field has a value "UID-usr1". The AF Name field has a value "AFName-af1". The AF Syntax field has a value "AFSyntax-af1". The Service Ticket field has a value "STicket-usr1-write-afcat1". The AF Size field has a value "Size-af1". The AF Data field has a value "Data-af1".

In a case where the entity of AF exceeds the capacity of one packet, AF Data is divided into a plurality of pieces and transmitted as illustrated in FIG. 25 (Step S309). In this example, the data is transmitted in n divided pieces.

The AF Catalog verifies the value of the Service Ticket field of the Store AF Request packet with the public key of the AAA Server, and confirms that the AF Developer indicated by the User ID field has authority to write in the AF Catalog.

The AF Catalog then stores the value of the AF Data field, and allocates "AFID-af1" to AF as an identifier. Note that the AF Catalog previously holds the public key of the AAA Server.

Next, the AF Catalog returns the Store AF Response packet illustrated in FIG. 27 to the OSS/BSS (Step S310). The Store AF Response packet includes information as follows. The Packet Type field has a value "Store AF Response". The Status field has a value "OK" indicating normal processing. The AF ID field has a value "AFID-af1".

Then, when having received the Store AF Response packet, the OSS/BSS returns an Upload AF Response packet illustrated in FIG. 28 to the AF Developer (Step S311).

The Upload AF Response packet includes information as follows. The Packet Type field has a value "Upload AF Response". The Status field has a value "OK" indicating normal processing. The AF ID field has a value AFID-af1.

Subsequently, the AF Developer disconnects the TLS connection with the OSS/BSS (Step S312).

As a result of the AF registration processing, the AF Catalog in Zone 1 holds a table illustrated in FIG. 29. The Number of AF Entries field holds the number of registered AFs. In this example, the number is "1". This is followed by one set of the AF Name field, the AFSyntax field, the AF Size field, and the AF Data field.

The AF Name field holds the name of AF. In this example, the value is "AFName-af1". The AF Syntax field holds syntax such as an argument when AF is activated. In this example, the value is "AFSyntax-af1". The AF Size field holds the size of the entity of AF. In this example, the value is "Size-af1". The AF Data field holds the entity of AF. In this example, the value is "Data-af1".

The OSS/BSS in Zone 1 holds a table illustrated in FIG. 30. The Number of Users field holds the numbers of AF Developer, Chained-AF Developer, and Chained-AF User. In this example, the value is "1". This is followed by one set of a User ID field, a Number of Service Tickets field, and a Service Ticket field.

The User ID field holds an identifier of AF Developer, Chained-AF Developer, or Chained-AF User. In this example, the value is "UID-usr1". The Number of Service Tickets field holds the number of service tickets held by the OSS/BSS. In this example, the value is "1". The Service Ticket field holds the service ticket. In this example, the value is "STicket-usr1-write-afcat1".

Note that a date and time of issuance is recorded in Service Ticket, and Service Ticket becomes invalid when a certain period of time elapses after issuance. The Number of Estimate Entries field holds the number of Chained-AFs for which the execution cost estimate has been acquired. In this example, the value is "0".

(1.3.4. Chained-AF Registration Procedure)

Figure 31:
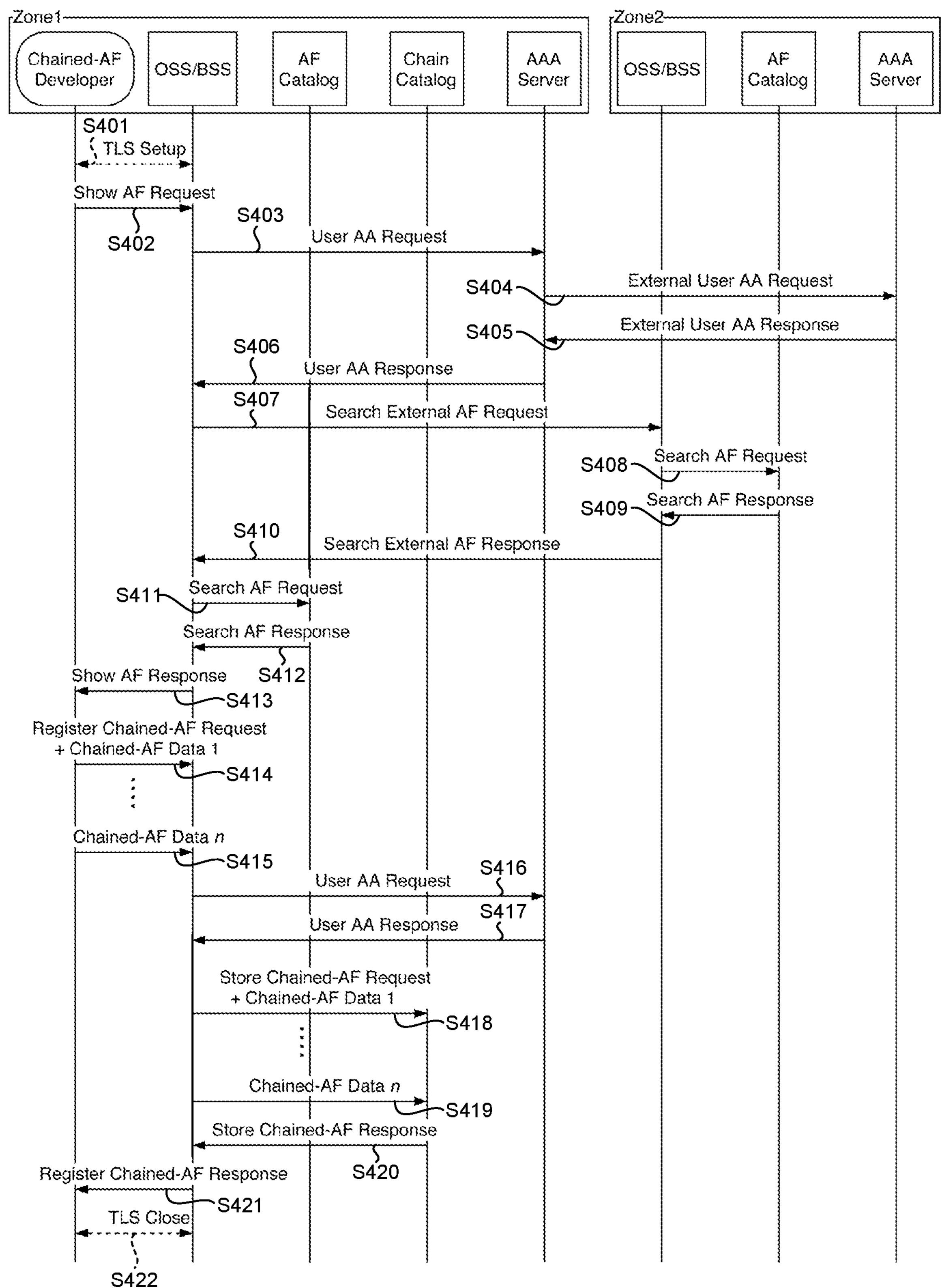
FIG. 31 is a diagram illustrating a processing procedure regarding Chained-AF registration processing.

Next, a procedure of registering Chained-AF will be described with reference to FIG. 31. FIG. 31 is a diagram illustrating a processing procedure regarding a Chained-AF registration processing. FIG. 31 illustrates a procedure in which the Chained-AF Developer in Zone 1 creates Chained-AF using AF registered in the AF Catalog in Zone 1 and AF registered in the AF Catalog in Zone 2, and registers the created Chained-AF in the Chain Catalog in Zone 1.

Here, the identifier of Zone 1 is "ZID-zone1". In addition, the identifier of Zone 2 is "ZID-zone2". In addition, a condition under which the Chained-AF Developer searches for AF in the AF Catalog in Zone 1 is "SConditions-zone1-af". In addition, N identifiers of AFs searched under this condition are described as "AFEntry-zone1-af1" to "AFEntry-zone1-afN".

Furthermore, a condition under which the Chained-AF Developer searches for AF in the AF Catalog in Zone 2 is "SConditions-zone2-af". In addition, N identifiers of the AFs searched under this condition are described as "AFEntry-zone2-af1" to "AFEntry-zone2-afN".

Furthermore, the Chained-AF Developer has an identifier "UID-usr2". Furthermore, information for authentication and authorization of the Chained-AF Developer is described as "Cred-usr2". Cred-usr2 includes information such as a user name and a password of Chained-AF Developer, for example.

Furthermore, a service ticket indicating that the Chained-AF Developer has authority to read the AF Catalog in Zone 1 is described as "STicket-usr2-read-afcat1". Furthermore, a service ticket indicating that the Chained-AF Developer has authority to read the AF Catalog in Zone 2 is described as "STicket-usr2-read-afcat2". Furthermore, the service ticket indicating that the Chained-AF Developer has authority to write in the Chain Catalog in Zone 1 is described as "STicket-usr2-write-chaincat1".

In addition, the name of Chained-AF registered in the Chain Catalog by the Chained-AF Developer is "Chain- Name-chain1". Furthermore, the syntax of this Chained-AF is described as "AFSyntax-chain1". The syntax is, for example, information indicating an argument and a return value at time of activation, and the like. In addition, the size of the entity of this Chained-AF is described as "Size-chain1". In addition, data of the entity of this Chained-AF is described as "Data-chain1". Furthermore, an identifier allocated to this Chained-AF is described as "CID-chain1".

First, the Chained-AF Developer establishes a TLS connection with the OSS/BSS in Zone 1 (Step S401).

Subsequently, in order to obtain information regarding available AF registered in Zone 1 and the Zone 2, the Chained-AF Developer transmits a Show AF Request packet illustrated in FIG. 32 to the OSS/BSS in Zone 1 (Step S402).

The Show AF Request packet includes information as follows. The Packet Type field has a value "Show AF Request". The User ID field has a value "UID-usr2". The Credential field has a value "Cred-usr2". The Number of Zones field has a value "2". This is followed by two sets of the Zone ID field and the Search Conditions field.

The first Zone ID field has a value "ZID-zone1". The first Search Conditions field has a value "SConditions-zone1-af". The second Zone ID field has a value "ZID-zone2". The second Search Conditions field has a value "SConditions-zone2-af".

When having received the Show AF Request packet, the OSS/BSS in Zone 1 transmits a User AA Request packet illustrated in FIG. 33 to the AAA Server in Zone 1 (Step S403).

The User AA Request packet includes information as follows. The Packet Type field has a value "User AA Request". The User ID field has a value "UID-usr2". The Credential field has a value "Cred-usr2". The Action Type field has a value "Read" indicating the type of operation. The Action Target field has a value "AF Catalog" indicating an operation target. The Number of External Zone IDs field has a value "1". This is followed by one Zone ID field. The Zone ID field has a value "ZID-zone2".

The AAA Server in Zone 1 performs authentication and authorization of the Chained-AF Developer by the values of the User ID field, the Credential field, the Action Type field, and the Action Target field of the received User AA Request packet.

The AAA Server in Zone 1 then generates STicket-usr2-read-afcat1, which is a ticket indicating that the Chained-AF Developer has authority to read the AF Catalog. STicket-usr2-read-afcat1 is generated as follows, for example. A value of the User ID field, a value of the Action Type field, a value of the Action Target field, and a value of the current time of the User AA Request packet are concatenated, and then an electronic signature is applied the concatenated values using a secret key of the AAA Server in Zone 1.

Next, the AAA Server in Zone 1 transmits an External User AA Request packet illustrated in FIG. 34 to the AAA Server in Zone 2 (Step S404).

The External User AA Request packet includes information as follows. The Packet Type field has a value "External User AA Request". The User ID field has a value "UID-usr2". The Credential field has a value "Cred-usr2". The Action Type field has a value "Read" indicating the type of operation. The Action Target field has a value "AF Catalog" indicating an operation target.

The AAA Server in Zone 2 performs authentication and authorization of the Chained-AF Developer by the values of the User ID field, the Credential field, the Action Type field, and the Action Target field of the received External User AA Request packet.

The AAA Server in Zone 2 then generates STicket-usr2-read-afcat2, which is a ticket indicating that the Chained-AF Developer has authority to read the AF Catalog. STicket-usr2-read-afcat2 is generated as follows, for example. A value of the User ID field, a value of the Action Type field, a value of the Action Target field, and a value of the current time of the External User AA Request packet are concatenated, and then an electronic signature is applied the concatenated values using a secret key of the AAA Server in Zone 2.

Subsequently, the AAA Server in Zone 2 returns an External User AA Response packet illustrated in FIG. 35 to the AAA Server in Zone 1 (Step S405).

The External User AA Response packet includes information as follows. The Packet Type field has a value "External User AA Response". The Status field has a value "OK" indicating normal processing. The Service Ticket field has a value "STicket-usr2-read-afcat2".

When having received the External User AA Response packet, the AAA Server in Zone 1 returns the User AA Response packet illustrated in FIG. 36 to the OSS/BSS in Zone 1 (Step S406).

The User AA Response packet includes information as follows. The Packet Type field has a value "User AA Response". The Status field has a value "OK" indicating normal processing. The Number of Service Tickets field has a value "2". This is followed by two sets of the Zone ID field and the Service Ticket field.

The first Zone ID field has a value "ZID-zone1". The first Service Ticket field has a value "STicket-usr2-read-afcat1". The second Zone ID field has a value "ZID-zone2". The second Service Ticket field has a value "STicket-usr2-read-afcat2".

When having received the User AA Response packet, the OSS/BSS in Zone 1 transmits a Search External AF Request packet illustrated in FIG. 37 to the OSS/BSS in Zone 2 (Step S407).

The Search External AF Request packet includes information as follows. The Packet Type field has a value "Search External AF Request". The User ID field has a value "UID-usr2". The Service Ticket field has a value "STicket-usr2-read-afcat2". The Search Conditions field has a value "SConditions-zone2-af".

When having received the Search External AF Request packet, the OSS/BSS in Zone 2 transmits the Search AF Request packet illustrated in FIG. 38 to the AF Catalog in Zone 2 (Step S408).

The Search AF Request packet includes information as follows. The Packet Type field has a value "Search AF Request". The User ID field has a value "UID-usr2". The Service Ticket field has a value "STicket-usr2-read-afcat2". The Search Conditions field has a value "SConditions-zone2-af".

The AF Catalog in Zone 2 verifies the value of the Service Ticket field of the received Search AF Request packet with the public key of the AAA Server in Zone 2, and confirms that the Chained-AF Developer indicated by the User ID field has authority to read the AF Catalog. Note that the AF Catalog in Zone 2 previously holds the public key of the AAA Server in Zone 2.

Next, the AF Catalog in Zone 2 searches for AF according to the value of the Zone Search Conditions field of the received Search AF Request packet, and returns a Search AF Response packet illustrated in FIG. 39 to the OSS/BSS in Zone 2 (Step S409).

The Search AF Response packet includes information as follows. The Packet Type field has a value "Search AF Response". The Status field has a value "OK" indicating normal processing. The Number of AF Entries field has a value "Num-zone2-af" indicating the number of matched AF as a result of the search. This is followed by Num-zone2-af AF Entry fields. Each AF Entry field has a value being an identifier of a matched AF.

When having received the Search AF Response packet, the OSS/BSS in Zone 2 returns the Search External AF Response packet illustrated in FIG. 40 to the OSS/BSS in Zone 1 (Step S410).

The Search External AF Response packet includes information as follows. The Packet Type field has a value "Search External AF Response". The Status field has a value "OK" indicating normal processing. The Number of AF Entries field has a value "Num-zone2-af". This is followed by Num-zone2-af AF Entry fields. Each AF Entry field has a value being an identifier of a matched AF.

When having received the Search External AF Response packet, the OSS/BSS in Zone 1 transmits the Search AF Request packet illustrated in FIG. 41 to the AF Catalog in Zone 1 (Step S411).

The Search AF Request packet includes information as follows. The Packet Type field has a value "Search AF Request". The User ID field has a value "UID-usr2". The Service Ticket field has a value "STicket-usr2-read-afcat1". The Search Conditions field has a value "SConditions-zone1-af".

When having received the Search AF Request packet, the AF Catalog in Zone 1 verifies the value of the Service Ticket field of the Search AF Request packet with the public key of the AAA Server in Zone 1, and confirms that the Chained-AF Developer indicated by the User ID field has authority to read the AF Catalog in Zone 1. Note that the AF Catalog in Zone 1 previously holds a public key of the AAA Server in Zone 1.

Next, the AF Catalog in Zone 1 searches for AF according to the value of the Search Conditions field of the received Search AF Request packet, and returns a Search AF Response packet illustrated in FIG. 42 to the OSS/BSS in Zone 1 (Step S412).

The Search AF Response packet includes information as follows. The Packet Type field has a value "Search AF Response". The Status field has a value "OK" indicating normal processing. The Number of AF Entries field has a value "Num-zone1-af" indicating the number of AF matches as a result of the search. This is followed by Num-zone1-af AF Entry field. Each AF Entry field has a value being an identifier of a matched AF.

When having received the Search External AF Response packet in Step S410 and the Search AF Response packet in Step S412, the OSS/BSS in Zone 1 returns a Show AF Response packet illustrated in FIG. 43 to the Chained-AF Developer (Step S413).

The Show AF Response packet includes information as follows. The Packet Type field has a value "Show AF Response". The Status field has a value "OK" indicating normal processing. The Number of Zones field has a value "2". This is followed by two sets of the Zone ID field, the Number of AF Entries field, and the AF Entry field.

The first Zone ID field has a value "ZID-zone1". The first Number of AF Entries field has a value "Num-zone1-af". This is followed by Num-zone1-af AF Entry field. Each AF Entry field has a value being an identifier of a matched AF.

The second Zone ID field has a value "ZID-zone2". The second Number of AF Entries field has a value "Num-zone2-af". This is followed by Num-zone2-af AF Entry fields.

When having received the Show AF Response packet, the Chained-AF Developer determines AF to be used for Chained-AF to be created, and transmits a Register Chained-AF Request packet illustrated in FIG. 44 to the OSS/BSS in Zone 1 (Step S414).

The Register Chained-AF Request packet includes information as follows. The Packet Type field has a value "Register Chained-AF Request". The User ID field has a value "UID-usr2". The Credential field has a value "Cred-usr2". The Chained-AF Name field has a value "Chain-Name-chain1". The Chained-AF Syntax field has a value "ChainSyntax-chain1". The Chained-AF Size field has a value "Size-chain1". The Chained-AF Data field has a value "Data-chain1".

In a case where the entity of Chained-AF exceeds the capacity of one packet, Data-chain1 is divided into a plurality of pieces and transmitted as illustrated in FIG. 45 (Step S415). In this example, the data is transmitted in n divided pieces.

When having received the Register Chained-AF Request packet, the OSS/BSS in Zone 1 transmits a User AA Request packet illustrated in FIG. 46 to the AAA Server in Zone 1 (Step S416).

The User AA Request packet includes information as follows. The Packet Type field has a value "User AA Request". The User ID field has a value "UID-usr2". The Credential field has a value "Cred-usr2". The Action Type field has a value "Write" indicating writing. The Action Target field has a value "Chain Catalog" indicating an operation target.

The AAA Server in Zone 1 performs authentication and authorization of the Chained-AF Developer by the values of the User ID field, the Credential field, the Action Type field, and the Action Target field of the User AA Request packet.

The AAA Server in Zone 1 then generates STicket-usr2-write-chaincat1, which is a ticket indicating that the Chained-AF Developer has authority to write in the AF Catalog. STicket-usr2-write-chaincat1 is generated as follows, for example. A value of the User ID field, a value of the Action Type field, a value of the Action Target field, and a value of the current time of the User AA Request packet are concatenated, and then an electronic signature is applied the concatenated values using a secret key of the AAA Server in Zone 1.

Next, the AAA Server in Zone 1 returns a User AA Response packet illustrated in FIG. 47 to the OSS/BSS in Zone 1 (Step S417). The User AA Response packet includes information as follows. The Packet Type field has a value "User AA Response". The Status field has a value "OK" indicating normal processing. The Service Ticket field has a value "STicket-usr2-write-chaincat1".

When having received the User AA Response packet, the OSS/BSS in Zone 1 transmits the Store Chained-AF Request packet illustrated in FIG. 48 to the Chain Catalog in Zone 1 (Step S418).

The Store Chained-AF Request packet includes information as follows. The Packet Type field has a value "Store Chained-AF Request". The User ID field has a value "UID-usr2". The Chained-AF Name field has a value "Chain-Name-chain1". The Chained-AF Syntax field has a value "ChainSyntax-chain1". The Chained-AF Size field has a value "Size-chain1". The Chained-AF Data field has a value "Data-chain1".

In a case where Data-chain1 exceeds the capacity of one packet, Data-chain1 is divided into a plurality of pieces and transmitted as illustrated in FIG. 45 (Step S419). In this example, the data is transmitted in n divided pieces.

When having received the Store Chained-AF Request packet, the Chain Catalog in Zone 1 verifies the value of the Service Ticket field of the Store Chained-AF Request packet with the public key of the AAA Server in Zone 1, and confirms that the Chained-AF Developer indicated by the User ID field has authority to write in the Chain Catalog in Zone 1. Note that the Chain Catalog in Zone 1 previously holds a public key of the AAA Server in Zone 1.

Next, Chain Catalog in Zone 1 records Chained-AF Data included in the Store Chained-AF Request packet. Furthermore, an identifier "CID-chain1" is assigned to the registered Chained-AF.

Then, the Chain Catalog in Zone 1 returns a Store Chained-AF Response packet illustrated in FIG. 49 to the OSS/BSS (Step S420).

The Store Chained-AF Response packet includes information as follows. The Packet Type field has a value "Store Chained-AF Response". The Status field has a value "OK" indicating normal processing. The Chained-AF ID field has a value "CID-chain1".

When having received the Store Chained-AF Response packet, the OSS/BSS in Zone 1 returns the Register Chained-AF Response packet illustrated in FIG. 50 to the Chained-AF Developer (Step S421).

The Register Chained-AF Response packet includes information as follows. The Packet Type field has a value "Register Chained-AF Response". The Status field has a value "OK" indicating normal processing. The Chained-AF ID field has a value "CID-chain1".

Subsequently, the Chained-AF Developer disconnects the TLS connection with the OSS/BSS in Zone 1 (Step S422).

As a result of the Chained-AF registration processing, Chain Catalog in Zone 1 holds a table illustrated in FIG. 51. The Number of Chained-AF Entries field holds the number of registered Chained-AFs. In this example, the value is "1". This is followed by one set of a Chained-AF Name field, a Chained-AF Syntax field, a Chained-AF Size field, and a Chained-AF Data field.

The Chained-AF Name field holds the name of the registered Chained-AF. In this example, the value is "ChainName-chain1". The Chained-AF Syntax field holds syntax information at the time of activation of the registered Chained-AF. In this example, the value is "ChainSyntax-chain1". The Chained-AF Size field holds the size of the registered Chained-AF. In this example, the value is "Size-chain1". The Chained-AF Data field holds the entity of the registered Chained-AF. In this example, the value is "Data-chain1".

The OSS/BSS in Zone 1 holds a table illustrated in FIG. 52. Compared with the table illustrated in FIG. 30, the value of the Number of Users field is changed to "2" from "1", and the second User ID field and subsequent fields have been added. The added User ID field has a value "UID-usr2".

Furthermore, the added Number of Service Tickets field has a value "3". This is followed by three Service Ticket fields. In this example, the first Service Ticket field has a value "STicket-usr2-read-afcat1". The second Service Ticket field has a value "STicket-usr2-read-afcat2". The third Service Ticket field has a value "STicket-usr2-write-chaincat1". The date and time of issuance is recorded in Service Ticket, and Service Ticket becomes invalid when a certain period of time elapses after issuance.

(1.3.5. Chained-AF Execution Cost Estimate Acquisition Procedure)

Figure 53:
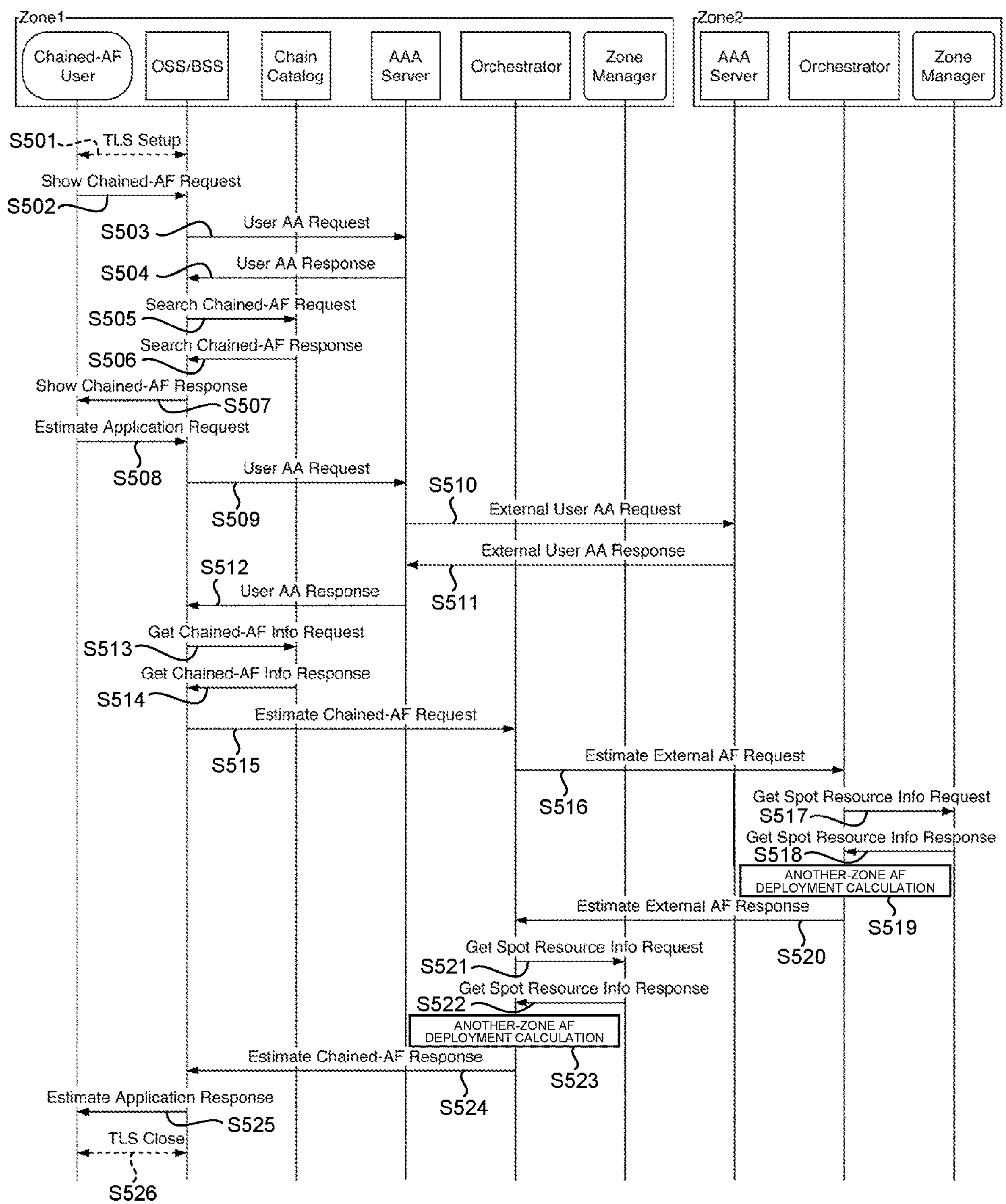
FIG. 53 is a diagram illustrating a processing procedure regarding Chained-AF execution cost estimate acquisition processing.

Next, a procedure of acquiring an estimate for the Chained-AF execution cost will be described with reference to FIG. 53. FIG. 53 is a diagram illustrating a processing procedure regarding Chained-AF execution cost estimate acquisition processing. Note that FIG. 53 illustrates a procedure in which the Chained-AF User in Zone 1 first searches for Chained-AF registered in Zone 1 and determines the Chained-AF to be used, and then obtains an estimate for the execution cost of the Chained-AF to be used.

Here, the Chained-AF User has an identifier "UID-usr3". Furthermore, the information used for authentication and authorization of the Chained-AF User is described as "Cred-usr3". Cred-usr3 includes a user name and a password of Chained-AF User, for example.

Furthermore, a service ticket indicating that Chained-AF User has authority to read Chain Catalog in Zone 1 is described as "STicket-usr3-read-chaincat1". Furthermore, a service ticket indicating that the Chained-AF User has authority to acquire the execution cost estimate for Chained-AF from an Orchestrator in Zone 1 is described as "STicket-usr3-est-orch1". Furthermore, a service ticket indicating that the Chained-AF User has authority to acquire an execution cost estimate for Chained-AF from an Orchestrator in Zone 2 is described as "STicket-usr3-est-orch2".

In addition, a condition under which the Chained-AF User searches for AF in the Chain Catalog in Zone 1 is described as "SConditions-zone1-chain". N pieces of information regarding Chained-AF searched under this condition are described as "ChainEntry-zone1-chain1" to "ChainEntry-zone1-afN". Note that the information regarding Chained-AF includes an identifier of Chained-AF.

Furthermore, information specific to Chained-AF User is described as "Info-usr3". Info-usr3 includes a geographical position of Chained-AF User, for example.

In addition, the identifier of the Chained-AF to be the execution cost estimate acquisition target of the Chained-AF User is described as "CID-chain2". Furthermore, the configuration information regarding Chained-AF indicated by CID-chain2 is described as "Info-chain2". The configuration information regarding Chained-AF includes an IP address of a node in which AF is deployed and a connection relationship between AF. Info-chain2 includes an identifier of AF constituting Chained-AF, the number of CPU cores required for each AF, a memory capacity, and the like.

The estimate for the execution cost of Chained-AF indicated by CID-chain2 is described as "Estimate-chain2". The computing resource information and the network resource information in Zone 1 are described as "Info-zone1-res". In addition, the computing resource information and the network resource information in Zone 2 are described as "Info-zone2-res".

Furthermore, among the AFs included in the Chained-AF indicated by CID-chain2, the configuration information regarding the AF that requests the deployment in Zone 2 is described as "Info-ext-afs". Info-ext-afs includes an identifier of each AF, the number of CPU cores and memory capacity required for each AF, a network latency requirement from a connection point between Zone 1 and Zone 2 to each AF installed in Zone 2, and the like.

First, the Chained-AF User establishes a TLS connection with the OSS/BSS in Zone 1 (Step S501).

The Chained-AF User then transmits a Show Chained-AF Request packet illustrated in FIG. 54 to the OSS/BSS in Zone 1 (Step S502).

The Show Chained-AF Request packet includes information as follows. The Packet Type field has a value "Show Chained-AF Request". The User ID field has a value "UID-usr3". The Credential field has a value "Cred-usr3". The Search Conditions field has a value "SConditions-zone1-chain".

When having received the Show Chained-AF Request packet, the OSS/BSS in Zone 1 transmits a User AA Request packet illustrated in FIG. 55 to the AAA Server in Zone 1 (Step S503).

The User AA Request packet includes information as follows. The Packet Type field has a value "User AA Request". The User ID field has a value "UID-usr3". The Credential field has a value "Cred-usr3". The Action Type field has a value "Read" indicating the type of operation. The Action Target field has a value "Chain Catalog" indicating an operation target.

The AAA Server in Zone 1 performs authentication and authorization of the Chained-AF User by the values of the User ID field, the Credential field, the Action Type field, and the Action Target field of the User AA Request packet.

The AAA Server in Zone 1 generates STicket-usr3-read-chaincat1, which is a ticket indicating that the Chained-AF User has authority to read the Chain Catalog. STicket-usr3-read-chaincat1 is generated as follows, for example. A value of the User ID field, a value of the Action Type field, a value of the Action Target field, and a value of the current time of the User AA Request packet are concatenated, and then an electronic signature is applied the concatenated values using a secret key of the AAA Server in Zone 1.

Next, the AAA Server in Zone 1 returns a User AA Response packet illustrated in FIG. 56 to the OSS/BSS in Zone 1 (Step S504). The User AA Response packet includes information as follows. The Packet Type field has a value "User AA Response". The Status field has a value "OK" indicating normal processing. The Service Ticket field has a value "STicket-usr3-read-chaincat1".

When having received the User AA Response packet, the OSS/BSS in Zone 1 transmits a Search Chained-AF Request packet illustrated in FIG. 57 to the Chain Catalog in Zone 1 (Step S505).

The Search Chained-AF Request packet includes information as follows. The Packet Type field has a value "Search Chained-AF Request". The User ID field has a value "UID-usr3". The Service Ticket field has a value "STicket-usr3-read-chaincat1". The Search Conditions field has a value "SConditions-zone1-chain".

Subsequently, the Chain Catalog in Zone 1 verifies the value of the Service Ticket field of the Search Chained-AF Request packet with the public key of the AAA Server in Zone 1, and confirms that the Chained-AF User indicated by the User ID field has authority to read the Chain Catalog in Zone 1. Note that the Chain Catalog in Zone 1 previously holds a public key of the AAA Server in Zone 1.

Next, the Chain Catalog in Zone 1 searches for Chained-AF according to the value of the Search Conditions field of the received Search Chained-AF Request packet, and returns a Search Chained-AF Response packet illustrated in FIG. 58 to the OSS/BSS in Zone 1 (Step S506).

The Search Chained-AF Response packet includes information as follows. The Packet Type field has a value "Search Chained-AF Response". The Status field has a value "OK" indicating normal processing. The Number of Chained-AF Entries field has a value "Num-zone1-chain" indicating the number of Chained-AF matched as a result of the search. This is followed by Num-zone1-chain Chained-AF Entry fields. Each Chained-AF Entry field has a value being an identifier of a matched Chained-AF.

When having received the Search Chained-AF Response packet, the OSS/BSS in Zone 1 returns the Show Chained-AF Response packet illustrated in FIG. 59 to the Chained-AF User (Step S507).

The Show Chained-AF Response packet includes information as follows. The Packet Type field has a value "Show Chained-AF Response". The Status field has a value "OK" indicating normal processing. The Number of Chained-AF Entries field has a value "Num-zone1-chain". This is followed by Num-zone1-chain Chained-AF Entry fields. Each Chained-AF Entry field has a value being an identifier of a matched Chained-AF.

Subsequently, the Chained-AF User selects Chained-AF indicated by CID-chain2 from a plurality of Chained-AFs obtained by the Show Chained-AF Response.

Next, the Chained-AF User transmits an Estimate Application Request packet illustrated in FIG. 60 to the OSS/BSS in Zone 1 (Step S508).

The Estimate Application Request packet includes information as follows. The Packet Type field has a value "Estimate Application Request". The User ID field has a value "UID-usr3". The Credential field has a value "Cred-usr3". The Chained-AF ID field has a value "CID-chain2". The User Specific Info field has a value "Info-usr3".

When having received the Estimate Application Request packet, the OSS/BSS in Zone 1 transmits a User AA Request packet illustrated in FIG. 61 to the AAA Server in Zone 1 (Step S509).

The User AA Request packet includes information as follows. The Packet Type field has a value "User AA Request". The User ID field has a value "UID-usr3". The Credential field has a value "Cred-usr3". The Action Type field has a value "Estimate" indicating execution cost estimate acquisition. The Action Target is an "Orchestrator" indicating an operation target. The Number of External Zone IDs field has a value "1". This is followed by one Zone ID field. The Zone ID field has a value "ZID-zone2".

The AAA Server in Zone 1 performs authentication and authorization of the Chained-AF User by the values of the User ID field, the Credential field, the Action Type field, and the Action Target field of the User AA Request packet.

The AAA Server in Zone 1 then generates STicket-usr3-est-orch1, which is a ticket indicating that the Chained-AF User has authority to obtain an estimate for the execution cost of Chained-AF from the Orchestrator in Zone 1. STicket-usr3-est-orch1 is generated as follows, for example. A value of the User ID field, a value of the Action Type field, a value of the Action Target field, and a value of the current time of the User AA Request packet are concatenated, and then an electronic signature is applied the concatenated values using a secret key of the AAA Server in Zone 1.

Next, the AAA Server in Zone 1 transmits an External User AA Request packet illustrated in FIG. 62 to the AAA Server in Zone 2 (Step S510).

The External User AA Request packet includes information as follows. The Packet Type field has a value "External User AA Request". The User ID field has a value "UID-usr3". The Credential field has a value "Cred-usr3". The Action Type field has a value "Estimate" indicating the type of operation. The Action Target is an "Orchestrator" indicating an operation target.

The AAA Server in Zone 2 performs authentication and authorization of the Chained-AF User by the values of the User ID field, the Credential field, the Action Type field, and the Action Target field of the received External User AA Request packet.

The AAA Server in Zone 2 generates STicket-usr3-est-orch2, which is a ticket indicating that the Chained-AF User has authority to obtain an estimate for the execution cost of Chained-AF from the Orchestrator in Zone 2. STicket-usr3-est-orch2 is generated as follows, for example. A value of the User ID field, a value of the Action Type field, a value of the Action Target field, and a value of the current time of the External User AA Request packet are concatenated, and then an electronic signature is applied the concatenated values using a secret key of the AAA Server in Zone 2.

Next, the AAA Server in Zone 2 returns an External User AA Response packet illustrated in FIG. 63 to the AAA Server in Zone 1 (Step S511).

The External User AA Response packet includes information as follows. The Packet Type field has a value "External User AA Response". The Status field has a value "OK" indicating normal processing. The Service Ticket field has a value "STicket-usr3-est-orch2".

When having received the External User AA Response packet, the AAA Server in Zone 1 returns the User AA Response packet illustrated in FIG. 64 to the OSS/BSS in Zone 1 (Step S512).

The User AA Response packet includes information as follows. The Packet Type field has a value "User AA Response". The Status field has a value "OK" indicating normal processing. The Number of Service Tickets field has a value "2". This is followed by two Service Ticket fields. The first Service Ticket field has a value "STicket-usr3-est-orch1". The second Service Ticket field has a value "STicket-usr3-est-orch2".

When having received the User AA Response packet, the OSS/BSS in Zone 1 transmits a Get Chained-AF Info Request packet illustrated in FIG. 65 to the Chain Catalog in Zone 1 (Step S513).

The Get Chained-AF Info Request packet includes information as follows. The Packet Type field has a value "Get Chained-AF Info Request". The User ID field has a value "UID-usr3". The Chained-AF ID field has a value "CID-chain2". The Service Ticket field has a value "STicket-usr3-read-chaincat1".

Subsequently, the Chain Catalog in Zone 1 verifies the value of the Service Ticket field of the Get Chained-AF Info Request packet with the public key of the AAA Server in Zone 1, and confirms that the Chained-AF User indicated by the User ID field has authority to read the Chain Catalog in Zone 1.

Next, the Chain Catalog in Zone 1 reads Info-chain2, which is information related to Chained-AF indicated by the Chained-AF ID field of the received Get Chained-AF Info Request packet.

The Chain Catalog in Zone 1 then returns a Get Chained-AF Info Response packet illustrated in FIG. 66 to the OSS/BSS in Zone 1 (Step S514).

The Get Chained-AF Info Response packet includes information as follows. The Packet Type field has a value "Get Chained-AF Info Response". The Status field has a value "OK" indicating normal processing. The Chained-AF Info field has a value "Info-chain2".

When having received the Get Chained-AF Info Response packet, the OSS/BSS in Zone 1 transmits an Estimate Chained-AF Request packet illustrated in FIG. 67 to the Orchestrator in Zone 1 (Step S515).

The Estimate Chained-AF Request packet includes information as follows: The Packet Type field has a value "Estimate Chained-AF Request". The User ID field has a value "UID-usr3". The Chained-AF ID field has a value "CID-chain2". The User Specific Info field has a value "Info-usr3". Since AF included in Chained-AF indicated by CID-chain2 belongs to Zone 1 and Zone 2, the value of the Number of Service Tickets field is "2". This is followed by two Service Ticket fields.

The first Service Ticket field has a value "STicket-usr3-est-orch1". The second Service Ticket field has a value "STicket-usr3-est-orch2". The Chained-AF Info field has a value "Info-chain2".

When having received the Estimate Chained-AF Request packet, the Orchestrator in Zone 1 recognizes that the target Chained-AF includes AF belonging to the Zone 2, and thus transmits an Estimate External AF Request packet illustrated in FIG. 68 to the Orchestrator in Zone 2 (Step S516).

The Estimate External AF Request packet includes information as follows. The Packet Type field has a value "Estimate External AF Request". The User ID field has a value "UID-usr3". The Chained-AF ID field has a value "CID-chain2". The User Specific Info field has a value "Info-usr3". The Service Ticket field has a value "STicket-usr3-est-orch2". The External-AFs Info field has a value "Info-ext-afs".

Subsequently, the Orchestrator in Zone 2 verifies the value of the Service Ticket field of the Estimate External AF Request packet with the public key of the AAA Server in Zone 2, and then confirms that the Chained-AF User indicated by the User ID field has authority to acquire an estimate for the execution cost of the Chained-AF from the Orchestrator in Zone 2. Note that the Orchestrator in Zone 2 previously holds a public key of the AAA Server in Zone 2.

Next, the Orchestrator in Zone 2 transmits a Get Spot Resource Info Request packet illustrated in FIG. 69 to the Zone Manager in Zone 2 (Step S517).

The Get Spot Resource Info Request packet includes information as follows. The Packet Type field has a value "Get Spot Resource Info Request".

When having received a Get Spot Resource info Request packet, the Zone Manager in Zone 2 returns a Get Spot Resource Info Response packet illustrated in FIG. 70 to the Orchestrator in Zone 2 (Step S518).

The Get Spot Resource Info Response packet includes information as follows. The Packet Type field has a value "Get Spot Resource Info Response". The Status field has a value "OK" indicating normal processing. The Resource Info field has a value "Info-zone2-res".

When having received the Get Spot Resource Info Response packet, the Orchestrator in Zone 2 calculates the deployment destination of the AF and Estimate-chain2-zone2 which is the cost of executing the AF based on the value of the Resource Info field (Step S519).

Next, the Orchestrator in Zone 2 returns an Estimate External AF Response packet illustrated in FIG. 71 to the Orchestrator in Zone 1 (Step S520).

The Estimate External AF Response packet includes information as follows. The Packet Type field has a value "Estimate External AF Response". The Status field has a value "OK" indicating normal processing. The User ID field has a value "UID-usr3". The Chained-AF ID field has a value "CID-chain2". The Chained-AF Estimate field has a value "Estimate-chain2-zone2".

When having received the Estimate External AF Response packet, the Orchestrator in Zone 1 transmits a Get Spot Resource Info Request packet illustrated in FIG. 69 to the Zone Manager in Zone 1 (Step S521).

When having received the Get Spot Resource Info Request packet, the Zone Manager in Zone 1 generates Info-zone1-res which is resource information in Zone 1.

Next, the Zone Manager in Zone 1 returns a Get Spot Resource Info Response packet illustrated in FIG. 72 to the Orchestrator in Zone 1 (Step S522).

The Get Spot Resource Info Response packet includes information as follows. The Packet Type field has a value "Get Spot Resource Info Response". The Status field has a value "OK" indicating normal processing. The Resource Info field has a value "Info-zone1-res".

Subsequently, based on the value of the Chained-AF Estimate field of the Estimate External AF Response packet received in Step S520 and the value of the Resource Info field of the Get Spot Resource Info Response packet received in Step S522, the Orchestrator in Zone 1 calculates the deployment destination of the AF and Estimate-chain2 which is the cost of executing the AF (Step S523).

Next, the Orchestrator in Zone 1 returns an Estimate Chained-AF Response packet illustrated in FIG. 73 to the OSS/BSS in Zone 1 (Step S524).

The Estimate Chained-AF Response packet includes information as follows: The Packet Type field has a value "Estimate Chained-AF Response". The Status field has a value "OK" indicating normal processing. The User ID field has a value "UID-usr3". The Chained-AF ID field has a value "CID-chain2". The Chained-AF Estimate field has a value "Estimate-chain2".

When having received the Estimate Chained-AF Response packet, the OSS/BSS in Zone 1 returns an Estimate Application Response packet illustrated in FIG. 74 to the Chained-AF User (Step S525).

The Estimate Application Response packet includes information as follows. The Packet Type field has a value "Estimate Application Response". The Status field has a value "OK" indicating normal processing. The Chained-AF Estimate field has a value "Estimate-chain2".

Subsequently, the Chained-AF User disconnects the TLS connection with the OSS/BSS in Zone 1 (Step S526).

As a result of Chained-AF execution cost estimate acquisition processing, the Orchestrator in Zone 1 holds the table illustrated in FIG. 75. The Number of Chained-AFs field holds the number of installed Chained-AF. At this point, the value is "0".

In addition, the OSS/BSS in Zone 1 holds a table illustrated in FIG. 76. The Number of Users field holds the total number of AF Developer that has registered AF, Chained-AF Developer that has registered Chained-AF, and Chained-AF User that has installed Chained-AF. In this example, the value is "3". This is followed by three sets of service ticket information related to Developer or User.

The User ID field holds an identifier of Developer or User. The Number of Service Tickets field holds the number of service tickets. The Service Ticket field holds a service ticket. In this example, the Developer whose identifier is "UID-usr1" has one service ticket, the Developer whose identifier is "UID-usr2" has three service tickets, and the User whose identifier is "UID-usr3" has three service tickets. The date and time of issuance is recorded in Service Ticket, and Service Ticket becomes invalid when a certain period of time elapses after issuance.

The Number of Estimate Entries field holds the number of Chained-AFs for which the execution cost has been estimated. In this example, the number is "1". This is followed by one set of the Chained-AF Info field and the Chained-AF Estimate field. The Chained-AF Info field has a value "Info-chain2". The Chained-AF Estimate field has a value "Estimate-chain2".

(1.3.6. Chained-AF Installation Procedure)

Figure 77:
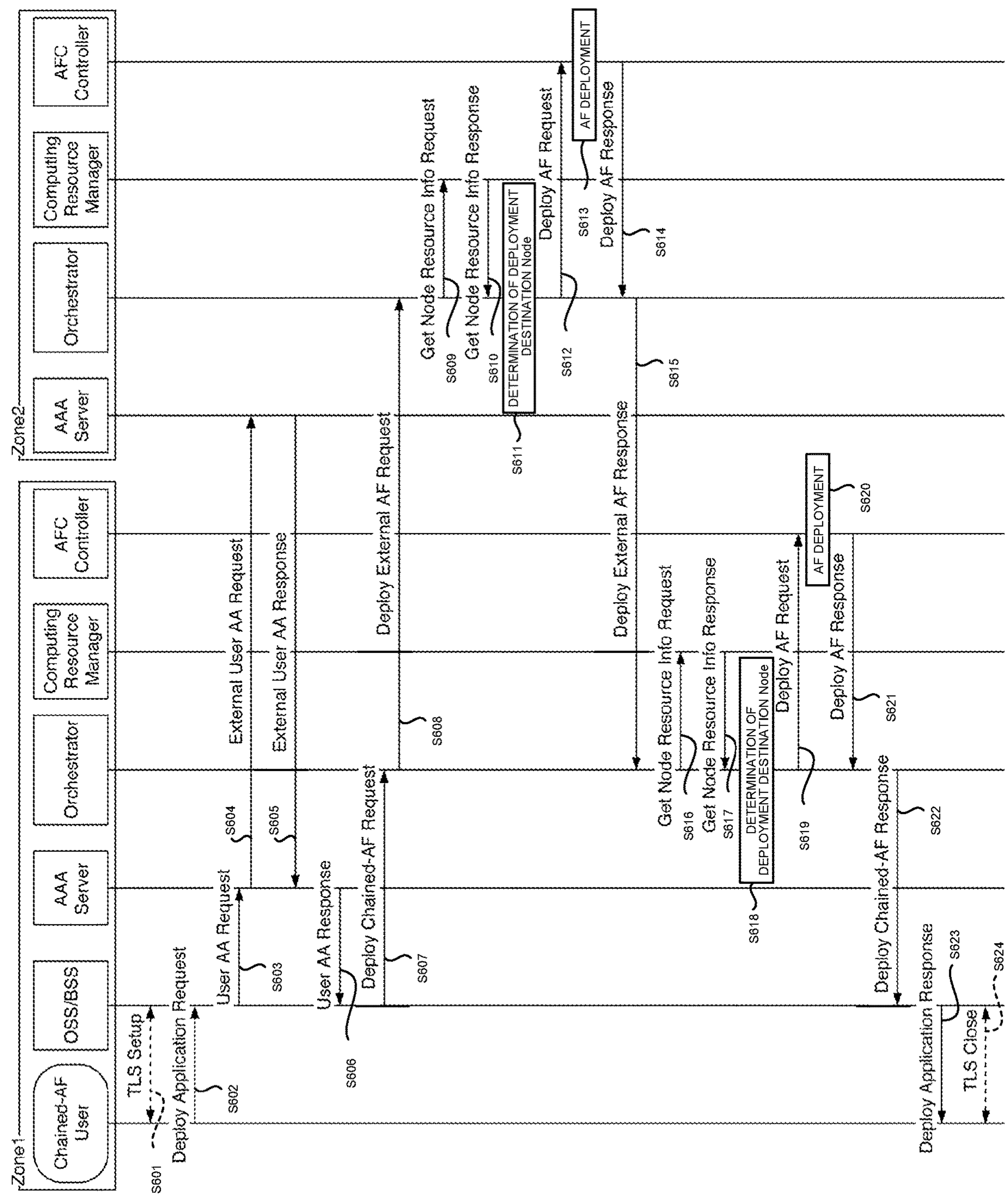
FIG. 77 is a diagram illustrating a processing procedure regarding Chained-AF installation processing.

Next, a procedure of installing Chained-AF will be described with reference to FIG. 77. FIG. 77 is a diagram illustrating a processing procedure regarding Chained-AF installation processing. Note that FIG. 77 illustrates a procedure in which the Chained-AF User in Zone 1 installs the Chained-AF represented by CID-chain2 across the Zone 1 and the Zone 2.

First, the Chained-AF User establishes a TLS session with the OSS/BSS in Zone 1 (Step S601).

Subsequently, the Chained-AF User transmits a Deploy Application Request packet illustrated in FIG. 78 to the OSS/BSS in Zone 1 (Step S602).

The deploy application request packet includes information as follows. The Packet Type field has a value "Deploy Application Request". The User ID field has a value "UID-usr3". The Credential field has a value "Cred-usr3". The Chained-AF ID field has a value "CID-chain2". Note that the Chained-AF User has obtained CID-chain2 from the Show Chained-AF Response packet illustrated in FIG. 59 (refer to Step S507).

When having received the Deploy Application Request packet, the OSS/BSS in Zone 1 transmits a User AA Request packet illustrated in FIG. 79 to the AAA Server in Zone 1 (Step S603).

The User AA Request packet includes information as follows. The Packet Type field has a value "User AA Request". The User ID field has a value "UID-usr3". The Credential field has a value "Cred-usr3". The Action Type field has a value "Deploy" indicating installation of Chained-AF. The Action Target field has a value "Orchestrator" indicating an operation target. The Number of External Zone IDs field has a value "1". This is followed by one Zone ID field. The Zone ID field has a value "ZID-zone2".

The AAA Server in Zone 1 performs authentication and authorization of the Chained-AF User by the values of the User ID field, the Credential field, the Action Type field, and the Action Target field of the User AA Request packet.

The AAA Server in Zone 1 then generates STicket-usr3-deploy-orch1, which is a ticket indicating that the Chained-AF User has authority to install Chained-AF in Zone 1. STicket-usr3-deploy-orch1 is generated as follows, for example. A value of the User ID field, a value of the Action Type field, a value of the Action Target field, and a value of the current time of the User AA Request packet are concatenated, and then an electronic signature is applied the concatenated values using a secret key of the AAA Server in Zone 1.

Next, the AAA Server in Zone 1 transmits an External User AA Request packet illustrated in FIG. 80 to the AAA Server in Zone 2 (Step S604).

The External User AA Request packet includes information as follows. The Packet Type field has a value "External User AA Request". The User ID field has a value "UID-usr3". The Credential field has a value "Cred-usr3". The Action Type field has a value "Deploy" indicating installation of Chained-AF. The Action Target field has a value "Orchestrator" indicating an operation target.

The AAA Server in Zone 2 performs authentication and authorization of the Chained-AF User by the values of the User ID field, the Credential field, the Action Type field, and the Action Target field of the received External User AA Request packet.

Subsequently, the AAA Server in Zone 2 generates STicket-usr3-deploy-orch2, which is a ticket indicating that Chained-AF User indicated by the value of the User ID field of the External User AA Request packet has authority to request the Orchestrator in Zone 2 to perform AF deployment. STicket-usr3-deploy-orch2 is generated as follows, for example. A value of the User ID field, a value of the Action Type field, a value of the Action Target field, and a value of the current time of the External User AA Request packet are concatenated, and then an electronic signature is applied the concatenated values using a secret key of the AAA Server in Zone 2.

Next, the AAA Server in Zone 2 returns an External User AA Response packet illustrated in FIG. 81 to the AAA Server in Zone 1 (Step S605).

The External User AA Response packet includes information as follows. The Packet Type field has a value "External User AA Response". The Status field has a value "OK" indicating normal processing. The Service Ticket field has a value "STicket-usr3-deploy-orch2".

When having received the External User AA Response packet, the AAA Server in Zone 1 returns the User AA Response packet illustrated in FIG. 82 to the OSS/BSS in Zone 1 (Step S606).

The User AA Response packet includes information as follows. The Packet Type field has a value "User AA Response". The Status field has a value "OK" indicating normal processing. The Number of Service Tickets field has a value "2". This is followed by two sets of the Zone ID field and the Service Ticket field.

The first Zone ID field has a value "ZID-zone1". The first Service Ticket field has a value "STicket-usr3-deploy-orch1". The second Zone ID field has a value "ZID-zone2". The second Service Ticket field has a value "STicket-usr3-deploy-orch2".

When having received the User AA Response packet, the OSS/BSS in Zone 1 transmits a Deploy Chained-AF Request packet illustrated in FIG. 83 to the Orchestrator in Zone 1 (Step S607).

The Deploy Chained-AF Request packet includes information as follows. The Packet Type field has a value "Deploy Chained-AF Request". The User ID field has a value "UID-usr3". The Chained-AF ID field has a value "CID-chain2". The Number of Service Tickets field has a value "2". This is followed by two Service Ticket fields.

The first Service Ticket field has a value "STicket-usr3-deploy-orch1". The second Service Ticket field has a value "STicket-usr3-deploy-orch2". The Chained-AF Info field has a value "Info-chain2".

When having received the Deploy Chained-AF Request packet, the Orchestrator in Zone 1 transmits a Deploy External AF Request packet illustrated in FIG. 84 to the Orchestrator in Zone 2 (Step S608).

The Deploy External AF Request packet includes information as follows. The Packet Type field has a value "Deploy External AF Request". The User ID field has a value "UID-usr3". The Chained-AF ID field has a value "CID-chain2". The Service Ticket field has a value "STicket-usr3-deploy-orch2". The Chained-AF Info field has a value "Info-chain2".

The Orchestrator in Zone 2 verifies the value of the Service Ticket field of the received Deploy External AF Request packet with the public key of the AAA Server in Zone 2, and confirms that the Chained-AF User indicated by the User ID field has authority to install AF.

Next, the Orchestrator in Zone 2 transmits a Get Node Resource Info Request packet illustrated in FIG. 85 to the Computing Resource Manager in Zone 2 (Step S609).

The Get Node Resource Info Request packet includes information as follows. The Packet Type field has a value "Get Node Resource Info Request". The Number of Spots field has a value "Num-chain2-zone2-spot" indicating the number of Spots for which resource information is to be acquired in Zone 2. The Spot ID List field has a value "List-chain2-zone2-sid" indicating a list of identifiers of Spots for which resource information is to be acquired in Zone 2.

When having received the Get Node Resource Info Request packet, the Computing Resource Manager in Zone 2 returns a Get Node Resource Info Response packet illustrated in FIG. 86 to the Orchestrator in Zone 2 (Step S610).

The Get Node Resource Info Response packet includes information as follows. The Packet Type field has a value "Get Node Resource Info Response". The Status field has a value "OK" indicating normal processing. The Number of Spot Entries field has a value "Num-chain2-zone2-spot". This is followed by Num-chain2-zone2-spot pairs of Spot ID field and Resource Info field.

Based on the values of the Spot ID field and the Resource Info field of the Get Node Resource Info Response packet, the Orchestrator in Zone 2 determines an AF deployment destination Node in Zone 2 (Step S611). This AF deployment information is described as "Info-chain2-zone2".

Next, the Orchestrator in Zone 2 transmits a Deploy AF Request packet illustrated in FIG. 87 to the AFC Controller in Zone 2 (Step S612).

The Deploy AF Request packet includes information as follows. The Packet Type field has a value "Deploy AF Request". The User ID field has a value "UID-usr3". The Chained-AF ID field has a value "CID-chain2". The Chained-AF Info field has a value "Info-chain2-zone2".

When having received the Deploy AF Request packet, the AFC Controller in Zone 2 installs AF in Zone 2 (Step S613). The AF installation procedure is disclosed in JP 2019-134106 A filed by the applicant of the present application, and thus the description thereof is omitted here.

When the AF installation is completed, the AFC Controller in Zone 2 returns a Deploy AF Response packet illustrated in FIG. 88 to the Orchestrator in Zone 2 (Step S614).

The Deploy AF Response packet includes information as follows. The Packet Type field has a value "Deploy AF Response". The Status field has a value "OK" indicating normal processing. The User ID field has a value "UID-usr3". The Chained-AF ID field has a value "CID-chain2". The Chained-AF Result field has a value "Result-chain2-zone2" indicating the result of the AF installation.

When having received the Deploy AF Response packet, the Orchestrator in Zone 2 returns a Deploy External AF Response packet illustrated in FIG. 89 to the Orchestrator in Zone 1 (Step S615).

The Deploy External AF Response packet includes information as follows. The Packet Type field has a value "Deploy External AF Response". The Status field has a value "OK" indicating normal processing. The User ID field has a value "UID-usr3". The Chained-AF ID field has a value "CID-chain2". The Chained-AF Result field has a value "Result-chain2-zone2".

When having received the Deploy External AF Response packet, the Orchestrator in Zone 1 transmits a Get Node Resource Info Request packet illustrated in FIG. 90 to the Computing Resource Manager in Zone 1 (Step S616).

The Get Node Resource Info Request packet includes information as follows. The Packet Type field has a value "Get Node Resource Info Request". The Number of Spots field has a value "Num-chain2-zone1-spot" indicating the number of Spots for which resource information is to be acquired in Zone 1. The Spot ID List field has a value "List-chain2-zone1-sid" indicating a list of identifiers of Spots for which resource information is to be acquired in Zone 1.

When having received the Get Node Resource Info Request packet, the Computing Resource Manager in Zone 1 returns a Get Node Resource Info Response packet illustrated in FIG. 91 to the Orchestrator in Zone 1 (Step S617).

The Get Node Resource Info Response packet includes information as follows. The Packet Type field has a value "Get Node Resource Info Response". The Status field has a value "OK" indicating normal processing. The Number of Spot Entries field has a value "Num-chain2-zone1-spot". This is followed by Num-chain2-zone1-spot pairs of Spot ID field and the Resource Info field.

Based on the values of the Spot ID field and the Resource Info field of the Get Node Resource Info Response packet, the Orchestrator in Zone 1 determines an AF deployment destination Node in Zone 1 (Step S618). This AF deployment information is described as "Info-chain2-zone1".

Next, the Orchestrator in Zone 1 transmits a Deploy AF Request packet illustrated in FIG. 92 to the AFC Controller in Zone 1 (Step S619).

The Deploy AF Request packet includes information as follows. The Packet Type field has a value "Deploy AF Request". The User ID field has a value "UID-usr3". The Chained-AF ID field has a value "CID-chain2". The Chained-AF Info field has a value "Info-chain2-zone1".

When having received the Deploy AF Request packet, the AFC Controller in Zone 1 installs AF in Zone 1 (Step S620). Since the AF installation procedure is similar to the procedure in Step S613, the description thereof will be omitted here.

When the AF installation is completed, the AFC Controller in Zone 1 returns a Deploy AF Response packet illustrated in FIG. 93 to the Orchestrator in Zone 1 (Step S621).

The Deploy AF Response packet includes information as follows. The Packet Type field has a value "Deploy AF Response". The Status field has a value "OK" indicating normal processing. The User ID field has a value "UID-usr3". The Chained-AF ID field has a value "CID-chain2". The Chained-AF Result field has a value "Result-chain2-zone1" indicating the result of the AF installation.

When having received the Deploy AF Response packet, the Orchestrator in Zone 1 returns a Deploy Chained-AF Response packet illustrated in FIG. 94 to the OSS/BSS in Zone 1 (Step S622).

The Deploy Chained-AF Response packet includes information as follows. The Packet Type field has a value "Deploy Chained-AF Response". The Status field has a value "OK" indicating normal processing. The User ID field has a value "UID-usr3". The Chained-AF ID field has a value "CID-chain2". The Chained-AF Result field has a value "Result-chain2".

When having received the Deploy Chained-AF Response packet, the OSS/BSS in Zone 1 returns a Deploy Application Response packet illustrated in FIG. 95 to the Chained-AF User (Step S623).

The Deploy Application Response packet includes information as follows. The Packet Type field has a value "Deploy Application Response". The Status field has a value "OK" indicating normal processing. The Chained-AF Result field has a value "Result-chain2".

Subsequently, the Chained-AF User disconnects the TLS session with the OSS/BSS in Zone 1 (Step S624).

As a result of the Chained-AF installation processing, the Orchestrator in Zone 1 holds a table illustrated in FIG. 96. The Number of Chained-AFs field holds the number of installed Chained-AF. In this example, the value is "1". This is followed by one set of the Chained-AF ID field and the Chained-AF Info field. The Chained-AF ID field has a value "CID-chain2". The Chained-AF Info field has a value "info-chain2".

The OSS/BSS in Zone 1 holds a table illustrated in FIG. 97. Compared with the table illustrated in FIG. 76, the number of service tickets included in UID-usr3 has been increased from "3" to "5", and "STicket-usr3-deploy-orch1" and "STicket-usr3-deploy-orch2" have been added as service tickets. The date and time of issuance is recorded in Service Ticket, and Service Ticket becomes invalid when a certain period of time elapses after issuance.

(1.3.7. Chained-AF Accounting Procedure)

Figure 98:
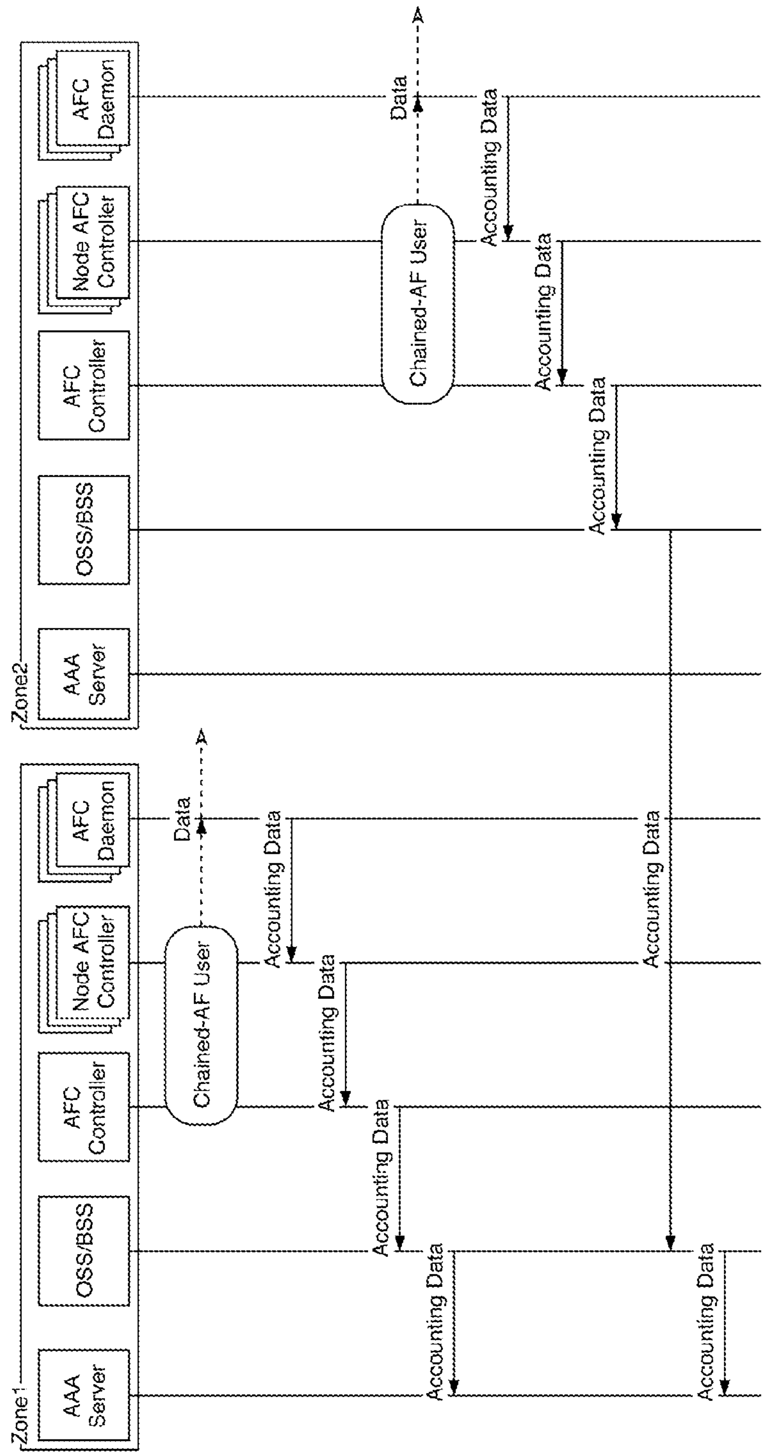
FIG. 98 is a diagram illustrating a processing procedure regarding Chained-AF accounting processing.

Next, a Chained-AF accounting procedure will be described with reference to FIG. 98. FIG. 98 is a diagram illustrating a processing procedure regarding Chained-AF accounting processing.

In the example illustrated in FIG. 98, a Chained-AF User indicated by "UID-usr3" transmits a data packet to Chained-AF indicated by "CID-chain 2", and the data packet passes through the AF indicated by "AFID-af1" in Zone 1 and the AF indicated by "AFID-af2" in Zone 2.

Figures 99, 100:
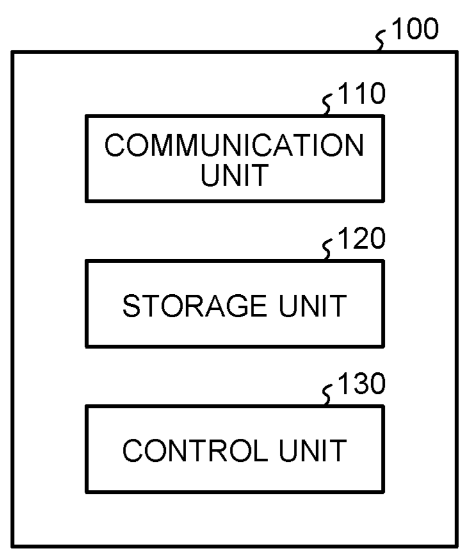
FIG. 99 is a diagram illustrating a structure example of an Accounting packet.
FIG. 100 is a diagram illustrating a functional configuration example of a communication device that can function as each node according to an embodiment of the present disclosure.

At the time of passage of the data packet, an AFC Daemon paired with the AF indicated by "AFID-af1" transmits an Accounting packet illustrated in FIG. 99 to the Node AFC Controller.

The Accounting packet includes information as follows: The Packet Type field has a value "Accounting". The User ID field has a value "UID-usr3". The Zone ID field has a value "ZID-zone1". The Spot ID field has a value "SID-spot1". The Chained-AF ID field has a value "CID-chain2". The AF ID field has a value "AFID-af1". The Usage field has a value "Usage-usr3-af1" indicating resource use status information. The resource use status information is execution time of AF, for example.

The Accounting packet passes through the Node AFC Controller, the AFC Controller, and the OSS/BSS in Zone 1 so as to finally reach the AAA Server in Zone 1. The AAA Server in Zone 1 records Accounting packet information.

The AFC Daemon paired with the AF indicated by AFID-af2 also transmits a similar Accounting packet. The Accounting packet passes through the Node AFC Controller, the AFC Controller, and the OSS/BSS in Zone 2 so as to finally reach the AAA Server in Zone 1. The AAA Server in Zone 1 records Accounting packet information.

The embodiment of the present disclosure has been described above. Next, a functional configuration example of a communication device that can function as each application or node according to the embodiment of the present disclosure will be described.

[1.4. Functional Configuration Example of Communication Device]

FIG. 100 is a diagram illustrating a functional configuration example of a communication device 100 that can function as each node according to an embodiment of the present disclosure. The communication device 100 illustrated in FIG. 100 includes a communication unit 110, a storage unit 120, and a control unit 130.

The communication unit 110 executes communication between nodes. Communication between nodes may be wired or wireless communication. Under the control of the control unit 130, the above-described packet and message are exchanged between the communication unit 110 with another node, by using a predetermined port for transmission and using a predetermined port for reception.

The storage unit 120 stores various types of information and programs used in the above-described AFC architecture. For example, the storage unit 120 stores the above-described various tables. The storage unit 120 can include various types of memory, HDD, and the like.

The control unit 130 includes a processor such as a central processing unit (CPU), for example, and executes processing based on the above-described AFC architecture. For example, based on various requests from the user, and the like, the control unit 130 executes various types of processing such as computing resource information collection processing, network resource information collection processing, AF registration processing, Chained-AF registration processing, Chained-AF execution cost estimate acquisition processing, Chained-AF installation processing, and Chained-AF accounting processing.

Note that the user, namely, the AF Developer, the Chained-AF Developer, or the Chained-AF User makes various requests to the communication device 100 via a user terminal (not illustrated), for example.

The user terminal is a terminal device used by a user. Examples of the user terminal includes an information processing device such as a mobile phone including a smartphone, a tablet terminal, a desktop PC, a laptop PC, or a Personal Digital Assistant (PDA). In addition, the user terminal also includes a wearable device which is an eyeglass-type or watch-type information processing terminal.

The user terminal acquires various types of information according to an operation by the user or a function (for example, a function of executing an application for using a service provided by the OSS/BSS, a browser function, and the like) of the user terminal, and generates and transmits information according to the acquired information.

At the Chained-AF execution cost estimate acquisition processing, for example, the user terminal presents a Chained-AF selection screen to the user based on the Chain Catalog and allows the user to select a certain Chained-AF.

Accordingly, for example, the Orchestrator acquires an estimate for the execution cost of Chained-AF across the Zones, calculates AF deployment, and presents the candidates for the optimal deployment to the user via the user terminal. The user selects the Chained-AF to activate from such candidates, and requests the installation of the Chained-AF via the user terminal.

2. SUMMARY

As described above, according to the embodiment of the present disclosure, a communication device capable of achieving the AFC-MANO is provided.

Individual steps in the process executed by individual devices in the present specification need not necessarily be processed sequentially in the order described as a sequence diagram or a flowchart. For example, individual steps in the process executed by individual devices may be processed in an order different from the order described as the flowchart, or may be processed in parallel.

In addition, it is also possible to create a computer program for causing hardware such as a CPU, read only memory (ROM), and random access memory (RAM) built in each device to exhibit a function equivalent to the configuration of each device described above. A storage medium storing the computer program can also be provided. Furthermore, with a configuration using hardware to form the individual function blocks illustrated in the functional block diagram, it is also possible to actualize the series of processes by hardware.

The preferred embodiments of the present disclosure have been described in detail above with reference to the accompanying drawings. However, the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

[2.1. Effects]

As described above, the communication device 100 according to the present disclosure is a communication device that operates as an Orchestrator (corresponding to an example of a "management node") in Zone 1 (corresponding to an example of a "first zone") that is a management domain on a network, and includes: the communication unit 110 that executes communication with another node; and the control unit 130 that controls communication executed by the communication unit 110. In addition, when having received, from a user, a request related to Chained-AF (corresponding to an example of an "application") that chains one or more AFs to act on a packet flowing through the network, the control unit 130 acquires information related to Chained-AF from Zone 2 (corresponding to an example of a "second zone") being a management domain other than Zone 1, and calculates a deployment destination of AF in the network including Zone 1 and Zone 2 based on the information.

Therefore, according to the communication device 100 of the present disclosure, the problems of (b) to (d) and (g) can be solved, leading to achievement of AFC-MANO.

When having received a request for using a certain Chained-AF from the user, the control unit 130 acquires, from the Orchestrator in Zone 2, the execution cost in Zone 2 for a case where the Chained-AF is executed, calculates the execution cost in Zone 1 for a case where the Chained-AF is executed, and calculates the deployment destination of the AF based on the execution cost of each of the Zone 1 and the Zone 2.

Therefore, according to the communication device 100 of the present disclosure, the problems (d) and (g) can be solved, leading to achievement of AFC-MANO.

Furthermore, Zone 1 includes one or more Spots (corresponding to an example of a "resource base") each including one or more Nodes (corresponding to an example of a "node") that set AF to act on a packet. Based on resource information collected from each of Spots, the control unit 130 calculates an execution cost for a case where the Chained-AF is executed.

Therefore, according to the communication device 100 of the present disclosure, the problem of (a) described above can be solved, leading to achievement of AFC-MANO.

In addition, based on the computing resource information collected from each of Spots, the control unit 130 calculates the execution cost for a case where the Chained-AF is executed.

Therefore, according to the communication device 100 of the present disclosure, the problem of (a) described above can be solved, leading to achievement of AFC-MANO. In addition, the number of CPU cores, the memory capacity, and the like necessary for each AF can be calculated based on the computing resource information collected from each Spot, for example, the use status of the computing resource in the Node, and the like, leading to optimization of AF deployment accordingly.

In addition, based on the network resource information collected from each of Spot, the control unit 130 calculates the execution cost for a case where the Chained-AF is executed.

Therefore, according to the communication device 100 of the present disclosure, the problem of (a) described above can be solved, leading to achievement of AFC-MANO. In addition, based on network resource information collected from each Spot, for example, a network status such as latency or a use band, a network latency requirement or the like from a connection point between the Zone 1 and the Zone 2 to each AF installed in Zone 2 can be calculated, leading to optimization of AF deployment according to the calculation result.

In addition, Spot is deployed in a geographically dispersed manner.

Therefore, according to the communication device 100 of the present disclosure, the problems (a) and (f) can be solved, leading to achievement of AFC-MANO.

Furthermore, the Spot periodically acquires the resource information from the Node.

Therefore, according to the communication device 100 of the present disclosure, it is possible to optimize AF deployment while following dynamically changes in various types of resource information.

In addition, the Zone 1 includes an OSS/BSS (corresponding to an example of a "user management node") that manages users. When having received an AF registration request from a user, the OSS/BSS generates an AF Catalog (corresponding to an example of "AF catalog information") in Zone 1 in response to the registration request.

Therefore, according to the communication device 100 of the present disclosure, the problems (b) and (g) can be solved, leading to achievement of AFC-MANO.

In addition, when having received a Chained-AF registration request from the user, the OSS/BSS generates, in response to the registration request, Chain Catalog (corresponding to an example of "application catalog information") across Zone 1 and Zone 2 based on the AF Catalog in Zone 1 and the AF Catalog in Zone 2.

Therefore, according to the communication device 100 of the present disclosure, the problems (c) and (g) can be solved, leading to achievement of AFC-MANO.

Furthermore, when having received a Chained-AF installation request from the user, the control unit 130 performs control to install the AF being an element of Chained-AF across Zone 1 and Zone 2 in response to the installation request.

Therefore, according to the communication device 100 of the present disclosure, the problems (d) and (g) can be solved, leading to achievement of AFC-MANO.

Furthermore, each of the Zone 1 and the Zone 2 includes an AAA Server (corresponding to an example of a "server device") that performs user authentication, authorization, and collection of use history information regarding the user. When there is a request from the user regarding registration of AF, registration of Chained-AF, use of Chained-AF, or installation of Chained-AF, the control unit 130 causes the AAA Server to perform user authentication and authorization.

Therefore, according to the communication device 100 of the present disclosure, the problem of (e) described above can be solved, leading to achievement of AFC-MANO.

In addition, the AAA Server performs accounting regarding the user across Zone 1 and Zone 2 based on the use history information.

Therefore, according to the communication device 100 of the present disclosure, the problem of (e) described above can be solved, leading to achievement of AFC-MANO.

Furthermore, the communication device 100 according to the present disclosure is a communication device that operates as an Orchestrator in Zone 1 being a management domain on a network, and includes: the communication unit 110 that executes communication with another node; and the control unit 130 that controls communication executed by the communication unit 110. In addition, Zone 1 includes one or more Spots (corresponding to an example of a "resource base") each including one or more Nodes (corresponding to an example of a "node") that set one or more AFs to act on a packet flowing through the network in response to a request of a user. Moreover, the control unit 130 calculates the AF deployment destination in Zone 1 based on the resource information collected from each of the Spots.

Therefore, according to the communication device 100 of the present disclosure, the problems of (a) to (d) and (g) can be solved, leading to achievement of AFC-MANO.

The effects described in the present specification are merely examples, and thus, there may be other effects, not limited to the exemplified effects.

Note that the present technique can also have the following configurations.

(1)

A communication device that operates as a management node in a first zone being a management domain on a network, the communication device comprising:

a communication unit that executes communication with another node; and a control unit that controls communication executed by the communication unit, wherein the control unit operates such that, when having received, from a user, a request regarding an application that chains one or more application functions (AFs) to act on a packet flowing in the network, the control unit acquires information regarding the application from a second zone that is a management domain other than the first zone, and then calculates a deployment destination of the AF in the network including the first zone and the second zone based on the information.

(2)

The communication device according to (1), wherein the control unit operates such that, when having received a use request for a certain piece of the application from the user, the control unit acquires an execution cost in the second zone for a case where the application is executed, from the management node of the second zone, calculates an execution cost in the first zone for a case where the application is executed, and calculates the deployment destination of the AF based on the execution cost of each of the first zone and the second zone.

(3)

The communication device according to (2), wherein the first zone includes one or more resource bases each including one or more nodes that sets the AF to act on the packet, and the control unit calculates an execution cost for a case where the application is executed, based on resource information collected from each of the resource bases.

(4)

The communication device according to (3), wherein the control unit calculates an execution cost for a case where the application is executed, based on computing resource information collected from each of the resource bases.

(5)

The communication device according to (3), wherein the control unit calculates an execution cost for a case where the application is executed, based on network resource information collected from each of the resource bases.

(6)

The communication device according to (3), (4) or (5), wherein the resource bases are deployed in a geographically dispersed manner.

(7)

The communication device according to any one of (3) to (6), wherein the resource base periodically acquires the resource information from the node that sets the AF to act on the packet.

(8)

The communication device according to any one of (1) to (7), wherein the first zone includes a user management node that manages the user, and the user management node operates such that, when having received a registration request of the AF from the user, the user management node generates catalog information regarding the AF in the first zone in response to the registration request.

(9)

The communication device according to (8), wherein the user management node operates such that, when having received a registration request of the application from the user, the user management node generates, in response to the registration request, the catalog information regarding the application across the first zone and the second zone based on the catalog information regarding the AF in the first zone and the catalog information regarding the AF in the second zone.

(10)

The communication device according to any one of (1) to (9), wherein the control unit operates such that, when having received an installation request for the application from the user, the control unit performs control to install the AF being an element of the application across the first zone and the second zone, in response to the installation request.

(11)

The communication device according to any one of (1) to (10), wherein the first zone and the second zone each include a server device that performs authentication, authorization, and collection of use history information regarding the user, and the control unit operates such that, in a case where the user requests registration of the AF, registration of the application, use of the application, or installation of the application, the control unit causes the server device to perform authentication and authorization regarding the user.

(12)

The communication device according to (11), wherein the server device performs accounting regarding the user across the first zone and the second zone based on the use history information.

(13)

A communication device that operates as a management node in a first zone being a management domain on a network, the communication device comprising:

a communication unit that executes communication with another node;

a control unit that controls communication executed by the communication unit, wherein the first zone includes one or more resource bases each including one or more nodes that set one or more application functions (AFs) to act on a packet flowing through the network, in response to a request of a user, and the control unit calculates a deployment destination of the AF in the first zone based on resource information collected from each of the resource bases.

(14)

A communication method using a communication device that operates as a management node in a first zone being a management domain on a network, the communication method comprising:

executing communication with another node; and controlling communication with the another node, wherein the controlling includes operations such that, when having received, from a user, a request regarding an application that chains one or more application functions (AFs) to act on a packet flowing in the network, information regarding the application is acquired from a second zone being a management domain other than the first zone, and then a deployment destination of the AFs in the network including the first zone and the second zone is calculated based on the information.

(15)

A communication method using a communication device that operates as a management node in a first zone being a management domain on a network, the communication method comprising:

executing communication with another node;

controlling communication with the another node, wherein the first zone includes one or more resource bases each including one or more nodes that set one or more application functions (AFs) to act on a packet flowing through the network, in response to a request of a user, and the controlling includes calculating a deployment destination of the AF in the first zone based on resource information collected from each of the resource bases.

REFERENCE SIGNS LIST

100 COMMUNICATION DEVICE
110 COMMUNICATION UNIT
120 STORAGE UNIT
130 CONTROL UNIT

The invention claimed is:

1. A communication device, comprising:

at least one processor configured to:

control communication with a first node, wherein the communication device is configured to operate as a first management node in a first zone, and the first zone is a first management domain on a network;

receive, from a user, a first request regarding an application, wherein the application chains at least one application function (AF) to act on a packet that flows in the network;

acquire information regarding the application from a second zone, wherein the second zone is a second management domain different from the first zone; and determine, based on the information, a deployment destination of the at least one AF in the network including the first zone and the second zone.

2. The communication device according to claim 1, wherein the at least one processor is further configured to:

receive a use request for a certain piece of the application from the user;

acquire, from a second management node in the second zone, an execution cost in the second zone based on the application executed in the second zone and the received use request;

execute the application in the first zone;

calculate an execution cost in the first zone based on the execution of the application in the first zone; and determine the deployment destination of the at least one AF based on the execution cost in the first zone and the execution cost in the second zone.

3. The communication device according to claim 2, wherein the first zone includes at least one or more-resource base, the at least one resource base includes at least a second node that sets the at least one AF to act on the packet, and the at least one processor is further configured to:

collect resource information from the at least one resource base; and calculate the execution cost in the first zone based on the collected resource information.

4. The communication device according to claim 3, wherein the at least one processor is further configured to:

collect computing resource information from the at least one resource base; and calculate the execution cost in the first zone based on the collected computing resource information.

5. The communication device according to claim 3, wherein the at least one processor is further configured to:

collect network resource information from the at least one resource base; and calculate the execution cost in the first zone based on the collected network resource information.

6. The communication device according to claim 3, wherein the at least one resource base is deployable in a geographically dispersed manner.

7. The communication device according to claim 3, wherein the at least one resource base periodically acquires the resource information from the at least the second node.

8. The communication device according to claim 1, wherein the first zone includes a user management node that manages the user, the user management node receives a registration request of the at least one AF from the user, the user management node generates first catalog information regarding the at least one AF in the first zone, and the generation of the first catalog information is based on the registration request.

9. The communication device according to claim 8, wherein the user management node further generates, based on the registration request, second catalog information regarding the application across the first zone and the second zone, and the generation of the second catalog information is based on the first catalog information regarding the at least one AF in the first zone and third catalog information regarding the at least one AF in the second zone.

10. The communication device according to claim 1, wherein the at least one processor is further configured to:

receive an installation request for the application from the user; and control an installation of the at least one AF based on the installation request, wherein the at least one AF is an element of the application across the first zone and the second zone.

11. The communication device according to claim 1, wherein each of the first zone and the second zone includes a server device that performs authentication regarding the user, authorization regarding the user, and collection of use history information regarding the user, and the at least one processor is further configured to:

receive, from the user, a second request regarding one of registration of the at least one AF, registration of the application, use of the application, or installation of the application; and control, based on the second request, the server device to perform the authentication and the authorization regarding the user.

12. The communication device according to claim 11, wherein the server device performs an accounting process regarding the user across the first zone and the second zone based on the use history information.

13. A communication device, comprising:

at least one processor configured to:

control communication with another a first node, wherein the communication device is configured to operate as a management node in a first zone, the first zone is a management domain on a network, the first zone includes at least one resource base, and the at least one resource base includes at least a second node that sets, based on a request of a user, at least one application function (AF) to act on a packet that flows through the network, collect resource information from the at least one resource base; and determine a deployment destination of the at least one AF in the first zone based on the resource information collected from the at least one resource base.

14. A communication method, comprising:

in a communication device that operates as a management node in a first zone, the first zone being a management domain on a network:

executing communication with a first node;

controlling the communication with the first node;

receiving, from a user, a request regarding an application, wherein the application chains at least one application function (AF) to act on a packet flowing in the network;

acquiring information regarding the application from a second zone, wherein the second zone is a second management domain different from the first zone; and determining, based on the information, a deployment destination of the at least one AF in the network including the first zone and the second zone.

15. A communication method, comprising:

in a communication device that operates as a management node in a first zone, the first zone being a management domain on a network:

executing communication with a first node;

controlling the communication with the first node, wherein the first zone includes at least one resource base, and the at least one resource base includes at least a second node that sets, based on a request of a user, at least one application function (AF) to act on a packet flowing through the network;

collecting resource information from the at least one resource base; and determining a deployment destination of the at least one AF in the first zone based on the resource information collected from the at least one resource base.

* * * * *